US011424505B2

(12) United States Patent
Pare et al.

(10) Patent No.: US 11,424,505 B2
(45) Date of Patent: Aug. 23, 2022

(54) VIBRATION-DAMPED BATTERY, BATTERY CONTAINER, AND BATTERY PACK FOR USE DOWNHOLE

(71) Applicant: Vertex Downhole Ltd., Calgary (CA)

(72) Inventors: Quentin Pare, Calgary (CA); Carl Brown, Calgary (CA)

(73) Assignee: CHARGER INDUSTRIES CANADA LIMITED PARTNERSHIP, Calgary (CA)

( * ) Notice: Subject to any disclaimer, the term of this patent is extended or adjusted under 35 U.S.C. 154(b) by 322 days.

(21) Appl. No.: 16/027,904

(22) Filed: Jul. 5, 2018

(65) Prior Publication Data

US 2019/0393461 A1    Dec. 26, 2019

(30) Foreign Application Priority Data

Jun. 22, 2018    (WO) ................ PCT/CA2018/050778

(51) Int. Cl.
| *H01M 50/24* | (2021.01) |
| *F16F 15/08* | (2006.01) |
| *E21B 41/00* | (2006.01) |
| *H01M 50/213* | (2021.01) |

(52) U.S. Cl.
CPC ......... *H01M 50/24* (2021.01); *E21B 41/0085* (2013.01); *F16F 15/08* (2013.01); *H01M 50/213* (2021.01); *H01M 2220/30* (2013.01)

(58) Field of Classification Search
CPC ...... H01M 2/022; H01M 2/023; H01M 2/105; H01M 2/1094; H01M 2/20; H01M 2/30; H01M 2220/30; H01M 50/242; E21B 17/003; E21B 41/0085; E21B 47/017; F16F 1/38; F16F 15/08
See application file for complete search history.

(56) References Cited

U.S. PATENT DOCUMENTS

| 3,990,919 | A | * | 11/1976 | Krueger | ............... | H01M 50/50 |
| | | | | | | 429/100 |
| 4,309,818 | A | | 1/1982 | Kline | | |
| 4,547,833 | A | | 10/1985 | Sharp | | |
| 4,563,727 | A | * | 1/1986 | Curiel | ...................... | F21L 4/08 |
| | | | | | | 362/183 |
| 5,187,026 | A | * | 2/1993 | Scrivano | ............... | H01M 50/20 |
| | | | | | | 429/96 |
| 5,732,978 | A | * | 3/1998 | Tunnell, IV | ......... | G09B 29/004 |
| | | | | | | 283/34 |
| 5,879,833 | A | | 3/1999 | Yoshii et al. | | |
| 6,376,126 | B1 | | 4/2002 | Faust et al. | | |
| 7,749,643 | B2 | | 7/2010 | Tsai | | |
| 9,118,045 | B2 | | 8/2015 | Marshall et al. | | |
| 2009/0111015 | A1 | | 4/2009 | Wood et al. | | |
| 2010/0136374 | A1 | * | 6/2010 | Jang | ..................... | H01M 50/213 |
| | | | | | | 429/7 |
| 2011/0281140 | A1 | * | 11/2011 | Lee | ..................... | H01M 50/538 |
| | | | | | | 429/7 |
| 2011/0281144 | A1 | * | 11/2011 | Yoon | ...................... | H01M 2/30 |
| | | | | | | 429/7 |
| 2012/0225340 | A1 | | 9/2012 | Mullet et al. | | |
| 2012/0247832 | A1 | | 10/2012 | Cramer et al. | | |
| 2014/0335379 | A1 | * | 11/2014 | Tanii | ................... | H01M 50/543 |
| | | | | | | 429/7 |
| 2014/0335380 | A1 | * | 11/2014 | Riggs | .................. | H01M 6/5033 |
| | | | | | | 429/9 |
| 2016/0053557 | A1 | | 2/2016 | Whiteford et al. | | |
| 2016/0099448 | A1 | | 4/2016 | Ikeda et al. | | |
| 2016/0301111 | A1 | * | 10/2016 | Tyler | ...................... | H01M 10/48 |
| 2017/0301964 | A1 | * | 10/2017 | Murakami | .......... | H01M 10/613 |
| 2018/0258740 | A1 | * | 9/2018 | Logan | .................. | H01M 2/022 |

FOREIGN PATENT DOCUMENTS

| CA | 2469564 | A1 | 12/2004 |
| CA | 2337546 | C | 12/2010 |
| EP | 1376734 | A2 | 1/2004 |
| JP | 2009211908 | | 9/2009 |
| JP | 2009289656 | A | 12/2009 |
| JP | 2011146151 | A | 7/2011 |
| WO | 2018025559 | A1 | 2/2018 |

OTHER PUBLICATIONS

ISA/CA-Canadian Intellectual Property Office—The International Search Report and The Written Opinion dated Mar. 22, 2019 for PCT International Application No. PCT/CA2018/050778.
Canadian Intellectual Property Office—Office Action dated Mar. 26, 2019 for Canadian patent application No. 3009223.

* cited by examiner

*Primary Examiner* — Anca Eoff
(74) *Attorney, Agent, or Firm* — D. Doak Horne

(57) ABSTRACT

A battery, a battery container, and a battery pack, for use downhole in MWD operations, one or more of which incorporates lateral vibration damping. In a preferred embodiment each comprise specialized lateral vibration damping in the form of a plurality of longitudinally-extending resiliently-deformable ridges extending substantially a length of each and circumferentially spaced about an outer periphery. The resiliently-deformable ridges on the battery may be integrally formed and extend radially outwardly from a hollow resiliently-deformable sleeve, and formed of the same resiliently-deformable material of which the sleeve is comprised. The resiliently-deformable ridges on the battery container may extend radially inwardly or outwardly from a periphery thereof. Advantageously, the battery container can thus be free of potting material and thus be reusable when the batteries thereof need be replaced. In all instances the so-configured resiliently-deformable ridges serve to damp severe lateral vibratory forces exerted downhole on such batteries.

23 Claims, 16 Drawing Sheets

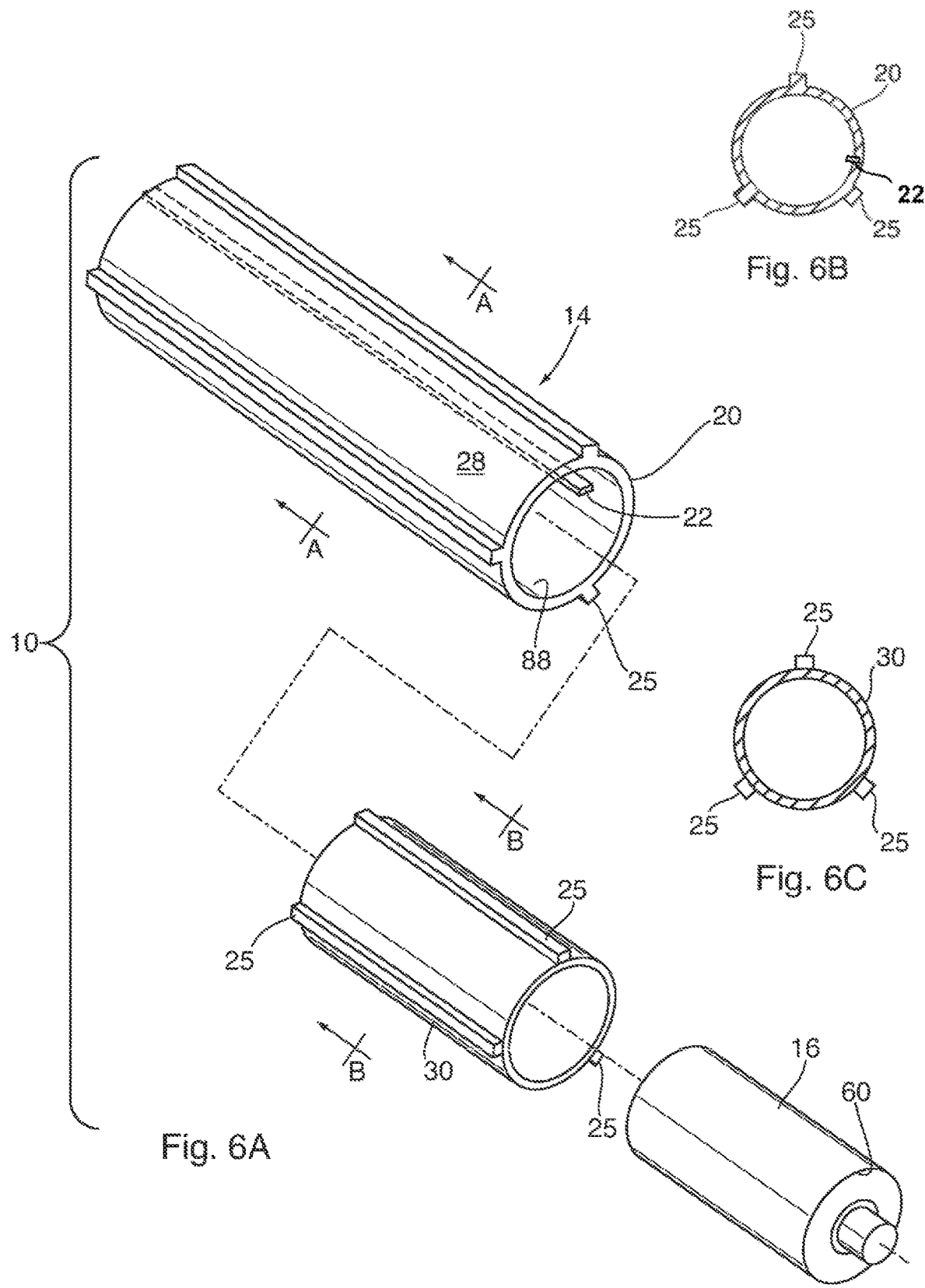

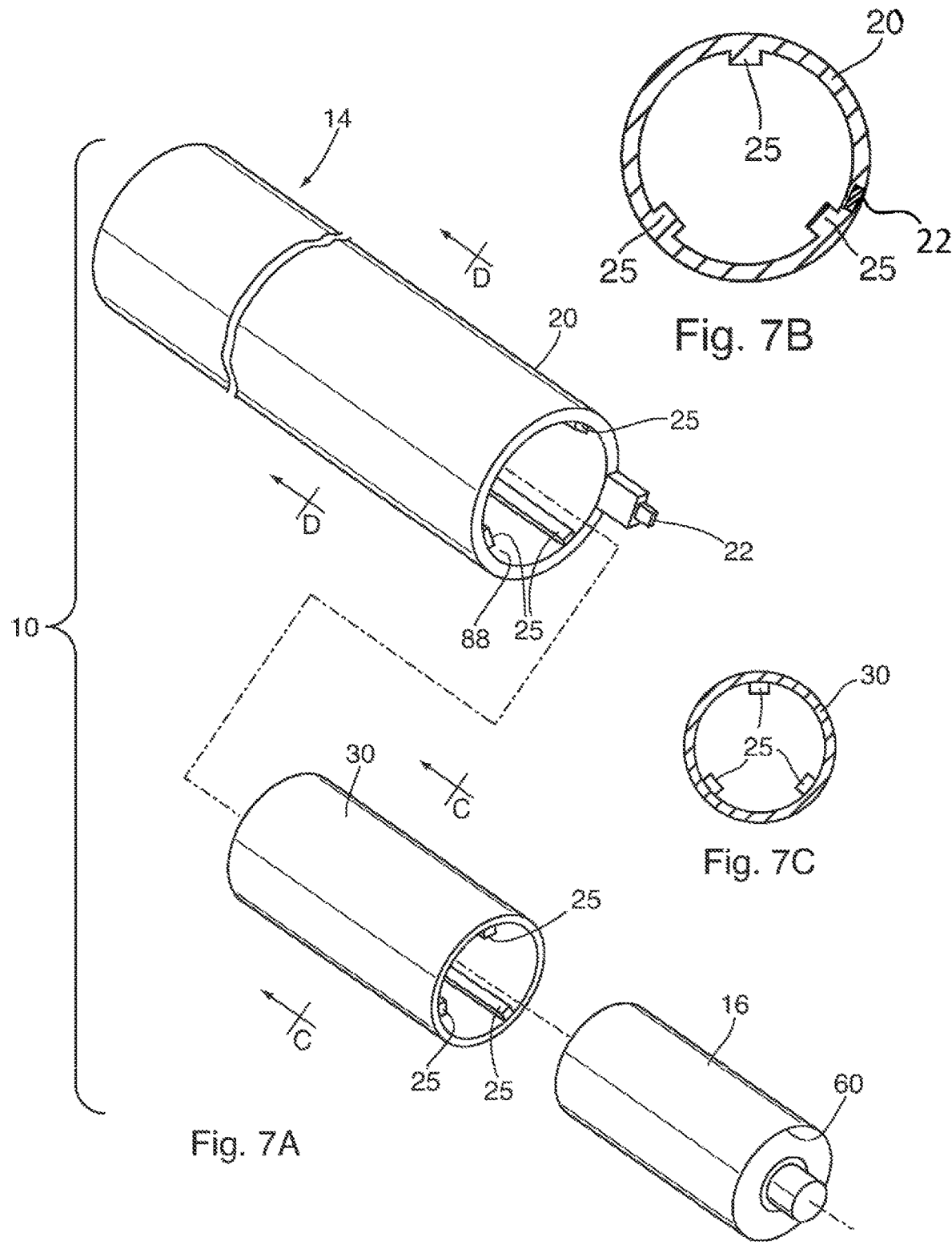

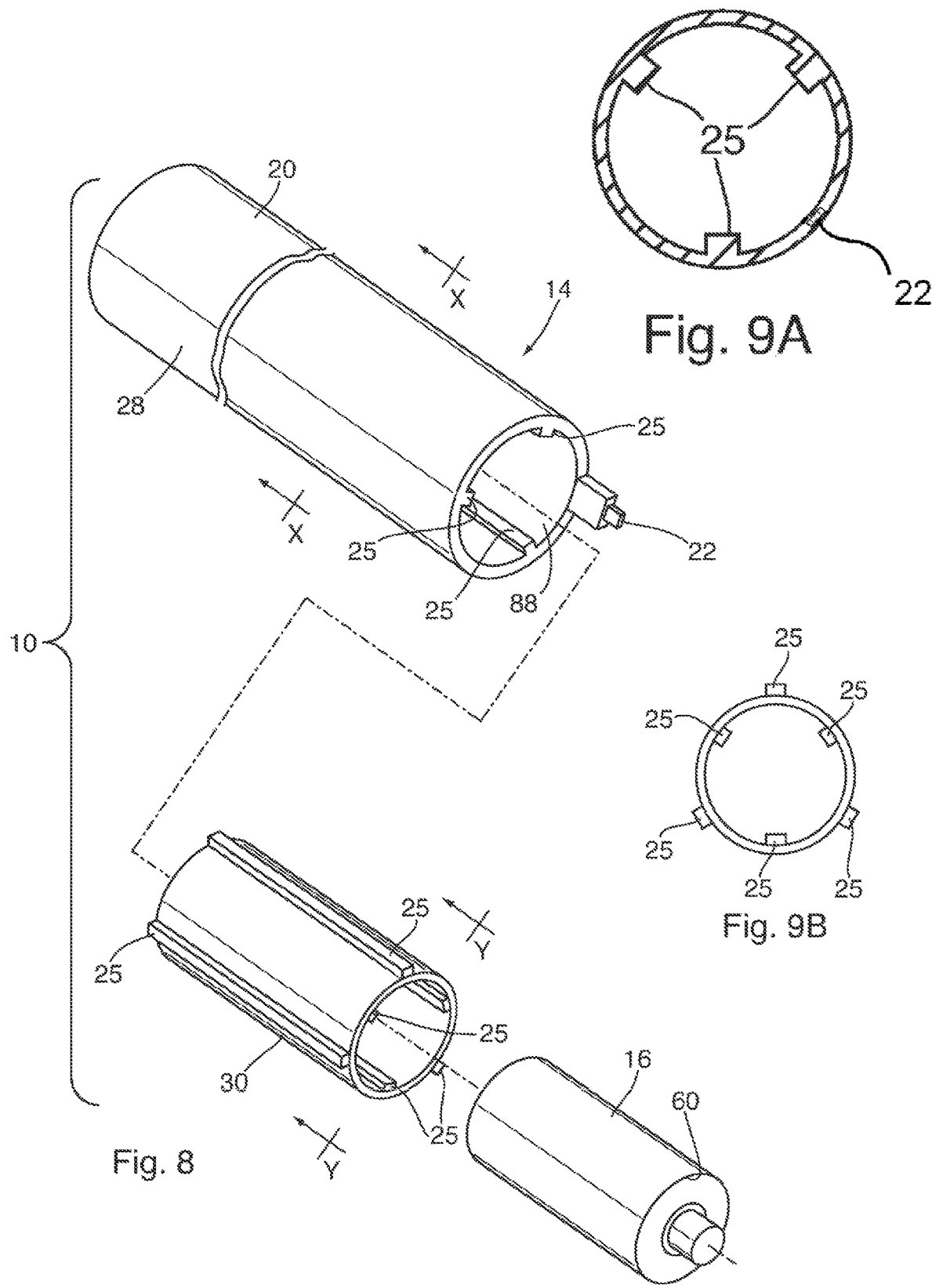

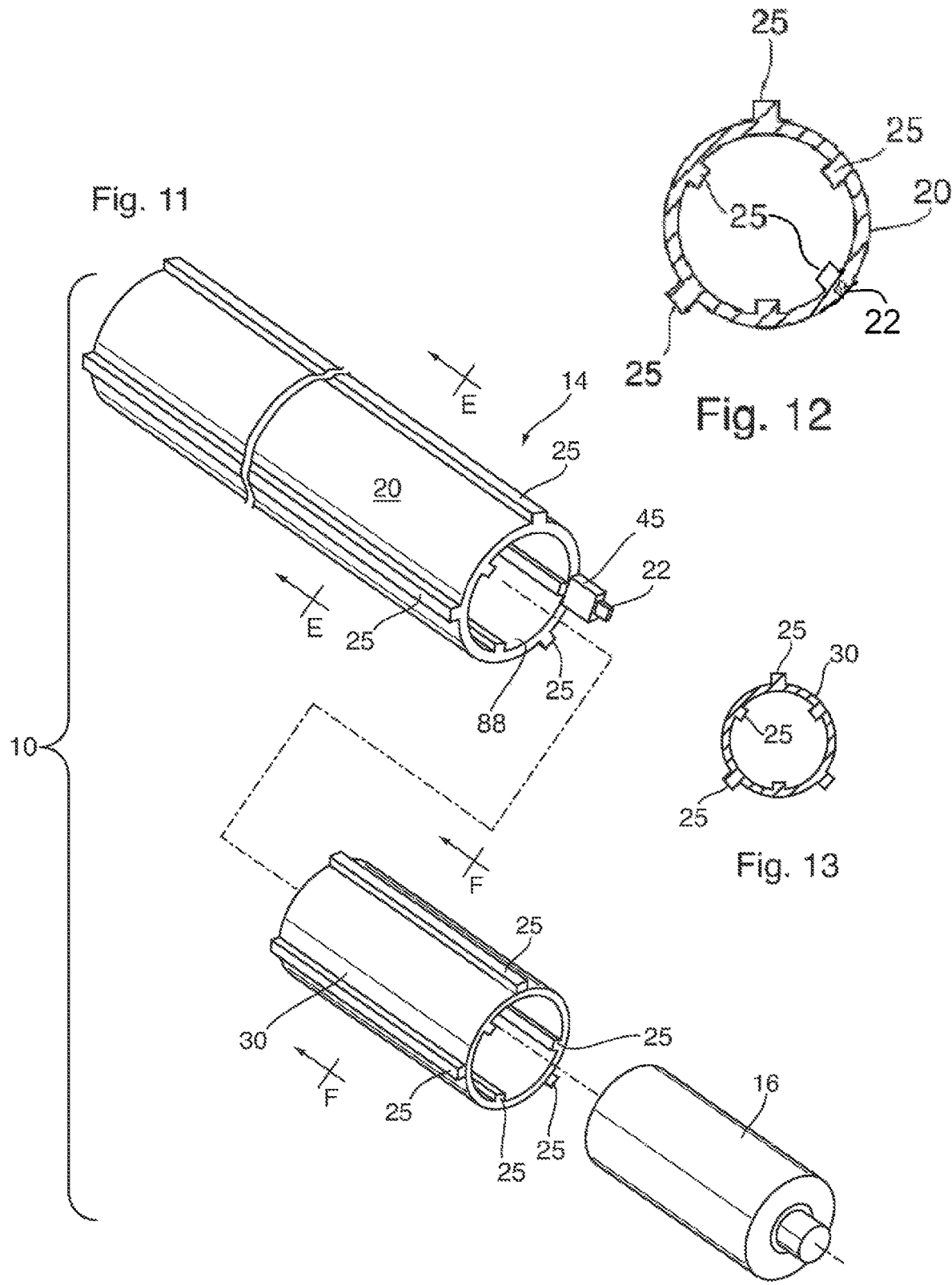

VIBRATION-DAMPED BATTERY, BATTERY CONTAINER, AND BATTERY PACK FOR USE DOWNHOLE

CROSS-REFERENCE

This application claims the benefit of priority from PCT International Application No. PCT/CA2018/050778, filed Jun. 22, 2018, which is hereby incorporated by reference in its entirety.

FIELD OF THE INVENTION

The present invention broadly relates to batteries, battery containers, and battery packs for use in downhole equipment such as measurement-while-drilling ("MWD) drilling equipment.

BACKGROUND OF THE INVENTION AND DESCRIPTION OF THE PRIOR ART

Drilling of wells, and in particular the drilling of directional /deviated wells, requires continuous measuring of sensed information as to the location of the drill bit, such as inclination of the drill string and drill bit, and the angular orientation (azimuth) thereof, so that this critical information may then be conveyed uphole in real time to the drill operator at surface to allow instantaneous adjustments to be made that will ensure the well is being drilled in a direction and into a formation as desired.

For such so-called "measurement while drilling" ("MWD") drilling applications, particularly where the drill bit is rotary steerable, sophisticated battery-powered electronics located in "subs" threadably inserted in the drill string proximate the drill bit sense the desired directional parameters in relation to the drill bit, encode such data, and transmit same a drilling operation located at surface.

Electro-mechanical devices such as mud pulsers situated downhole in the drill string and operatively electrically coupled to the downhole electronics, encode the sensed data into a series of pressure pulses. These pressure pulses travel uphole where they are sensed by additional electronic equipment and decoded into the relevant data for the operator to view in real time.

High-energy density batteries are typically needed in measurement-while-drilling operations to power mud pulsers which in turn open and close valves downhole in a particular coded sequence so as to create corresponding encoded pressure pulses to thereby transmit directional drilling information uphole to a drilling operation.

Typically, batteries for use in such applications, in order to achieve the high energy density and longevity needed, are required to be of the lithium metal anode type, to provide the needed high energy density in comparison to conventional primary batteries (i.e. lead acid type batteries).

Such lithium batteries typically comprise a helically wound "sandwich" of oxidative and reductive materials in sheet form, such sheets separated by electrically non-conductive thin sheets.

Disadvantageously, however, lithium batteries, in part due to the inherent high imparted vibratory stresses in downhole hostile environments, are frequently prone to failure, and in particular internal failure of the integrity and arrangement of the sheets of oxidative and reductive materials therein, resulting in expensive and frequent "tripping out" of the drill string to replace structurally-compromised or failed batteries.

Specifically, in oil drilling operation, such lithium batteries are located downhole in end-to end juxtaposed relation due to the dimensional restrictions of the wellbore, and are situated proximate the drill bit.

Accordingly and disadvantageously, due to being situate in close proximity to the drill bit, significant vibration and vibratory forces are exerted on such batteries during drilling and rapid cycling of high-pressure drilling fluids in order to be able to transmit drilling data uphole. As a result, internal structural failure of such lithium batteries due to induced vibration frequently occurs, which disadvantageously often leads to electrical "shorting" of the battery thereby rendering it inoperative or only capable of reduced electrical output.

Even more disadvantageously, however, electrical "shorting" of a high energy lithium battery due to internal structural failure caused by lateral vibratory forces imparted thereon often directly leads to rapid and build-up of heat within the battery. Such results in liquefaction and/or gasification of certain of the contents of the lithium battery and consequent extremely sudden and forceful explosion.

Indeed, downhole explosion of lithium batteries arising from structural failure of the battery components and resultant electrical shorting is a known and serious problem in directional drilling, particularly in MWD drilling.

The force of an exploding lithium battery or batteries downhole of the type and energy density currently used in MWD mud pulsers is comparable to the explosive force of an equivalent weight of dynamite. Such typically results in total destruction of downhole MWD pulsers and associated electronic sensors and circuitry therefor. This has the highly undesirable consequences of increased drilling expense not only to replace expensive wrecked tooling and equipment as well as exploded batteries and battery packs, but further as regards significant lost time and increased costs in "tripping out" the drill string, to say nothing of the hourly cost of mud pump trucks and men working such equipment which need be idle during tripping out and running in of the drill string when actual drilling is not occurring.

Accordingly, a real and serious need exists in the MWD drilling industry for high energy density batteries which can not only provide the required electrical power, but which can be prevented from structural failure and thus otherwise exploding downhole with the aforesaid highly undesirable consequences.

Some prior art "packaging" systems for MWD electronics have been created to attempt to isolate downhole MWD electronics from vibration and shock forces during drilling which act on the housing within the drill string.

For example, U.S. Pat. No. 4,547,833 entitled "High Density Electronics Packaging System for Hostile Environment" is one such packaging system which utilizes annular shoe supports provided on a chassis to isolate electronics from axial vibrations and axial forces. Such is a bulky solution, however, and is not targeted per se at isolating the batteries from vibrations but rather at isolating the downhole electronics from vibration, which as noted above, if only the electronics and not the batteries are isolated from vibration, such is an ineffective solution to the exploding battery problem.

Likewise, US 2016/0053557 entitled "Torsional Isolator" teaches a device which attempts to reduce (axial) vibration and shock during directional drilling inflicted on downhole electronics. Such device, however, is not directed at reducing lateral acceleration forces specifically, nor specifically reducing acceleration forces on downhole batteries but rather merely on the associated electronics powered by such batteries.

Still further, U.S. Pat. No. 7,749,643 entitled "Protective Battery Holding Structure" teaches for example in FIG. 10 and at col. 4, lines 10-20 a battery holder 2 for a cylindrical battery, such battery holder 2 having at least one rib 216 which extends inwardly from rectangular-shaped holder 2 so as to contact an outer surface of the battery. The point contact of the battery with such ribs 216 on the rectangular heat-resistant battery holder prevents heat produced by the battery during operation from transferring to and thereby damaging an outer case enclosing the battery holder. No elongate battery container for holding batteries in an end-to-end juxtaposed position is disclosed, nor are ribs 216 ever taught or suggested as being resiliently-deformable to reduce or damp any lateral vibration forces imparted on the batteries, since vibration of the batteries was not foreseen to be a problem in the specification, perhaps because lithium batteries were not in existence, or at least prevalent, at the date of this publication.

U.S. Pat. No. 4,309,818 entitled "Preformed Flex-Rib Battery Case" teaches a battery container for a typical lead-acid battery, the walls of which include integrally moulded resilient ribs extending at acute angles from the walls, to retain the battery's electrochemical innards in place. Although the ribs are plastically deformable, they exist entirely within the lead-acid solution of the battery and are not on the exterior of the battery, and accordingly do not reduce lateral vibratory forces applied to the battery.

U.S. Pat. No. 6,376,126 entitled "Composite Battery Container with Integral Flexible Ribs" teaches a battery having plate-rest ribs integrally formed on the sides and bottom of the cell compartments of the battery, such ribs formed of a thermoplastic elastomer which elastically deforms when a cell element is disposed within the cell compartment. Again, the ribs as taught in this patent are located within an interior of the battery and accordingly do not reduce lateral vibratory forces applied to the battery.

As regards present uses of lithium batteries and battery packs, battery containers and battery packs presently inserted in drilling string equipment for powering MWD equipment are presently typically injected with a "potting" material. Such potting material is initially a flowable liquid which is flowed into the battery container containing the batteries, but which quickly solidifies to a substantially rigid state. In doing so such potting material becomes permanently bonded to both the batteries within the battery compartment and to the battery container itself. The purpose of injecting such potting material is to attempt to isolate the batteries from movement and thus potential additional excessive high "g" forces and thus possibly prevent structural damage to the battery and thus its electrical shorting. However, injection of such potting material, depending on the composition, typically does not provide for effective lateral damping of the batteries, and thus fails to address what is now believed by the inventors to be the root cause of battery explosions, namely excessive and repetitive lateral vibratory forces which the inventors believe induces structural failure within the batteries. Moreover, as explained below, injection of such potting material into the battery containers thereafter renders such battery containers non-reusable, and such battery containers must be discarded along with the batteries therein once the electrochemical potential of the batteries is depleted through usage.

Specifically, not only is such injected potting material due to its rigidity when hardened, not particularly effective in damping of lateral vibratory forces exerted on the batteries within the longitudinal battery container and thus largely ineffective in consistently reducing structural failure of the batteries within the battery container, even more disadvantageously such potting material due to its solidification within the battery container permanently bonds and seals the batteries within the battery container. Such thereby necessitates that not only the batteries but the entire battery container be replaced when the batteries' life has been exhausted.

The aforementioned prior art methods and usages using potting material thus further increase the cost of maintenance when replacing batteries, let along being largely ineffective in consistently reducing structural failure of the batteries and thus failing to reduce incidences of battery explosions.

Accordingly, for the aforementioned additional reason, a real and serious need exists in the MWD drilling industry for high energy density batteries and battery packs which can not only provide the required electrical power and have decreased tendency to fail when subjected to vibratory forces, but which are less costly to maintain and allow reuse of the battery container in order to reduce maintenance costs.

The above background information and description of publications and current prior art battery compartment construction and manner of deployment is provided herein to give context to the advantages of the present invention over the prior art. No admission is intended nor should be construed that any of the above publications or information provided with respect to current practices and usages constitutes prior art against the present invention.

SUMMARY OF THE INVENTION

The inventors have accordingly caused to be invented a battery, battery container, and a battery pack for use downhole in a drilling environment, which is configured in all of its various embodiments to damp lateral acceleration forces which may otherwise be applied to the batteries and otherwise cause internal structural failure and resulting electrical "shorting" and potential consequent explosion of such battery(ies).

The invention is particularly suited for use with batteries of the lithium type, as more particularly described in U.S. Pat. No. 9,118,045 to Engineered Power Inc. entitled "High Temperature Lithium Battery, having initial Low Temperature Use Capability, which may be exposed to vibratory forces of the magnitude encountered in Measurement While Drilling (MWD) operations.

In a preferred embodiment, the configuration of each of the battery, the battery compartment, and/or the battery pack individually and jointly may contribute to damping of lateral vibratory forces exerted on the batteries when used downhole in MWD drilling operations, so as to reduce incidence of vibration-induced shorting and thus violent explosion of such batteries when used downhole.

Advantageously, the present invention allows for incorporation of the number of resiliently-flexible elongate deformable rib members and their placement on one or more of the battery, the battery container, or an inner sleeve, to allow, for a single resiliently-deformable material of a given modulus of elasticity, a means of varying the amount of stiffness and thus the degree of vibration resistance.

In addition, by virtue of the configuration, the battery container of the present invention and a battery pack utilizing such battery container are advantageously now re-usable and need not be disposed of when the batteries' electrochemical potential is depleted through use.

Accordingly, in a first broad embodiment of the present invention as regards a battery container, the present invention provides for an elongate cylindrical battery container for use in downhole in measurement-while-drilling operations which provides electrical power to a mud pulser and which battery container damps lateral vibration of at least one substantially cylindrical battery contained therein, and which comprises:

(i) an elongate, cylindrical hollow tube adapted to contain therewithin said at least one cylindrical battery;

(ii) at least one elongate electrically-conductive member extending longitudinally along a length of said elongate hollow tube, adapted at one end thereof to be in electrical communication with one electrical contact of said at least one cylindrical battery when said at least one cylindrical battery is inserted in said elongate hollow tube; and (iii) a plurality of resiliently-deformable protruding rib members uniformly disposed about or positioned along a cylindrical periphery of said elongate hollow tube, each of said rib members of a thickness so as to extend uniformly radially outwardly or inwardly from said cylindrical periphery of said elongate hollow tube and spaced about or along said cylindrical periphery of said elongate hollow tube;

wherein when said at least one cylindrical battery is inserted in said elongate hollow tube and said elongate hollow tube inserted in measurement-while-drilling equipment and then inserted downhole, said resiliently-deformable rib members absorb and damp lateral vibratory forces exerted on said at least one battery contained in said battery container.

In one embodiment, the resiliently-deformable rib members are molded and formed integrally with said elongate hollow tube.

In an alternative embodiment, the resiliently-deformable rib members are separate from and non-integral with the elongate hollow tube.

In a refinement of the battery container, the elongate electrically-conductive member is integrally moulded within said elongate hollow tube along said length of said elongate hollow tube.

In a further refinement, the plurality of resiliently-deformable rib members comprise a plurality of elongate longitudinally-extending members extending substantially a length of said elongate hollow tube and which are each in mutual parallel arrangement with each other and uniformly spaced about said cylindrical periphery of said elongate hollow tube. In a still-further refinement, the resiliently-deformable rib members are situated on an exterior of said cylindrical periphery of said elongate hollow tube, and an interior cylindrical periphery of said elongate hollow tube is in direct contact with each of said at least one cylindrical battery.

In an alternative embodiment, the plurality of resiliently-deformable rib members comprise a plurality of annular rings which are spaced longitudinally along substantially a length of said elongate hollow tube and in mutual parallel arrangement to each other.

In an alternative configuration, each of said at least one cylindrical batteries are circumferentially surrounded about said cylindrical periphery thereof by a thin resiliently-deformable sleeve. The resiliently-deformable rib members are integrally formed within said thin resiliently-deformable sleeve and disposed about or along an outer or inner cylindrical periphery of said thin resiliently-deformable sleeve. When a plurality of cylindrical batteries and associated sleeves are inserted in said elongate hollow tube and said elongate hollow tube inserted in measurement-while-drilling equipment and then inserted downhole, said resiliently-deformable rib members and said thin resiliently-deformable sleeves in a region of said resiliently-deformable rib members together absorb and damp lateral vibratory forces exerted on said elongate hollow tube and said cylindrical batteries contained therewithin.

In a further refinement, the electrically-conductive member comprises a thin, flat, elongate ribbon member having a width substantially greater than a thickness thereof and said width disposed within a portion of said cylindrical periphery of said elongate hollow tube. In a still further refinement, the thin resiliently-deformable material and said resiliently-deformable rib members are together formed from a two-part silicone rubber composition comprising a base and a curing agent, said base when mixed with said curing agent forming a resiliently-deformable, waterproof, electrically non-conductive flexible material. In one embodiment, the two-part silicone rubber composition is formed from ZIAMETER™ RTV-4130-J base and ZIAMETER[1] RTV-4130-J curing agent.

[1] Registered trademark of Dow Corning Corporation for a two-part silicon rubber supplied as a pourable fluid that cures to a firm flexible elastomer In a still-further refinement of the battery container of the present invention, a biasing member may be situated at one end of said elongate tube for exerting a force against said at least one battery for damping longitudinal vibrations exerted on said at least one battery when located in said battery container, and in a refinement the biasing member is a helical spring.

In an alternative aspect of the battery container of the present invention, such may comprise:

(i) an elongate, substantially cylindrical, hollow tube adapted to contain therewithin at least one substantially cylindrical battery;

(ii) at least one elongate electrically-conductive member extending substantially longitudinally along a length of said elongate hollow tube, adapted at one end thereof to be in electrical communication with one electrical contact of said at least one cylindrical battery when said at least one cylindrical battery is inserted in said elongate hollow tube; and (iii) a helical protruding rib member disposed around a cylindrical periphery of said battery container, of a thickness so as to extend uniformly radially outwardly or inwardly from said cylindrical periphery of said elongate hollow tube;

wherein when said at least one cylindrical battery is inserted in said elongate hollow tube and said elongate hollow tube inserted in measurement-while-drilling equipment and then inserted downhole, said resiliently-deformable rib member absorbs and damps lateral vibratory forces exerted on said at least one battery contained in said battery container.

In a further aspect of the present invention, the present invention relates to a cylindrical battery pack containing therewithin a plurality of elongate cylindrical batteries in end-to-end juxtaposed position for use downhole in measurement-while-drilling operations, which battery pack provides vibration reduction to said plurality of cylindrical batteries contained therein. The battery pack comprises:

(i) an elongate, substantially cylindrical hollow tube, containing therewithin said plurality of elongate substantially cylindrical batteries arranged end-to-end;

(ii) a flat, elongate, electrically conductive ribbon member integrally formed within said hollow tube, extending substantially the length of said hollow tube and in electrical communication with at least one of said plurality of cylindrical batteries when said plurality of cylindrical batteries are inserted in said hollow tube; and (iii) a plurality of elongate, resiliently-deformable longitudinally-extending rib members extending substantially along a longitudinal length of a periphery of said elongate hollow tube and/or along a longitudinal length of an outer cylindrical periphery of each of said plurality of cylindrical batteries contained therein, protruding radially from said cylindrical periphery of said elongate hollow tube and/or protruding radially from said outer cylindrical periphery of each of said cylindrical batteries, circumferentially spaced about said cylindrical periphery of said elongate hollow tube and/or said outer cylindrical periphery of each of said plurality of cylindrical batteries;

wherein when battery pack is inserted in measurement-while-drilling equipment and then inserted downhole, said resiliently-deformable rib members absorb and damp lateral vibratory forces exerted on said batteries contained therewithin.

In a further refinement of the aforementioned battery pack, the plurality of elongate, resiliently-deformable longitudinally-extending rib members extending substantially along a longitudinal length of an outer periphery of said elongate hollow tube. Alternatively, the plurality of elongate, resiliently-deformable longitudinally-extending rib members extending substantially along a longitudinal length of an inner periphery of said elongate hollow tube. In a preferred embodiment, the plurality of elongate, resiliently-deformable longitudinally-extending rib members extending substantially along a longitudinal length of both an outer and an inner periphery of said elongate hollow tube.

In a further or alternative refinement, the plurality of elongate, resiliently-deformable longitudinally-extending rib members of said battery pack extend substantially along a longitudinal length of each of said plurality of cylindrical batteries thereof.

Accordingly, in a further embodiment of the present invention, such invention comprises a battery for use downhole in measurement-while-drilling operations which provides lateral vibration damping. The battery of the present invention will typically be a lithium type, which is particularly prone and susceptible to vibration-caused shorting and failure, but is not limited to lithium batteries, and may be incorporated into any type of battery where significant downhole vibratory forces may denigrate battery performance or induce structural failure.

Accordingly, in such further aspect of the present invention, the battery of the present invention comprises an elongate substantially-cylindrical encapsulating tube surrounding oxidative and reductive metals, compounds or compositions, and at least three elongate, resiliently-deformable, longitudinally-extending rib members, each extending substantially along a longitudinal length of an outer periphery of said and circumferentially uniformly spaced about said outer cylindrical periphery of said encapsulating tube. When said battery is inserted in measurement-while-drilling equipment and then inserted downhole, said resiliently-deformable rib members absorb and damp lateral vibratory forces exerted on said battery.

In a further refinement of the battery of the present invention, such battery may comprise a thin hollow sleeve substantially uniformly and circumferentially surrounding said encapsulating tube, and the plurality of elongate, resiliently-deformable, longitudinally-extending mutually parallel rib members extend substantially along a longitudinal length of an outer periphery of said thin hollow sleeve and radially outwardly from an outer cylindrical periphery thereof. In a further refinement, the thin hollow sleeve is also resiliently deformable. Thus when said battery is inserted in measurement-while-drilling equipment and then inserted downhole, the resiliently-deformable rib members and said thin sleeve in a region of said resiliently-deformable rib members thereon together both absorb and damp lateral vibratory forces exerted on said battery.

In one embodiment, the longitudinally-extending rib members are each adhered to and extend outwardly from said encapsulating tube.

In a preferred embodiment, the battery of the present invention is further utilized within a battery container of the present invention, and in and forming a battery pack of the present invention.

BRIEF DESCRIPTION OF THE DRAWINGS

Further advantages and permutations and combinations of the invention will now appear from the above and from the following detailed description of the various particular embodiments of the invention, taken together with the accompanying drawings each of which are intended to be non-limiting, in which:

FIG. 6A is an exploded perspective view of another alternative battery pack of the present invention, containing at least one battery and having lateral damping means to reduce lateral vibrational energy imparted on the battery;

FIG. 6B is a cross-section, taken along plane B-B of FIG. 6A, where the resiliently-deformable (elastomeric) ribs are integral with the battery container which is also elastomeric;

FIG. 6C is a cross-section, taken along plane B-B of FIG. 6A, where the resiliently-deformable (elastomeric) ribs are integral with the sleeve member which is also elastomeric and which surrounds the battery;

FIG. 7A is an exploded perspective view of another alternative cross-section of an alternative embodiment of the battery pack;

FIG. 7B is a cross-section, taken along plane D-D of FIG. 7A, where the resiliently-deformable (elastomeric) ribs are integral with the battery container which is also elastomeric;

FIG. 7C is a cross-section, taken along plane C-C of FIG. 7A, where the resiliently-deformable (elastomeric) ribs are integral with the sleeve member which is also elastomeric;

FIG. 8 is a perspective exploded view of an alternative battery pack and battery compartment of the present invention, containing at least one battery and having lateral damping means to reduce lateral vibrational energy imparted on the battery;

FIG. 9A is a cross-section, taken along plane X-X of FIG. 8, where the resiliently-deformable (elastomeric) ribs are integral with the tube member;

FIG. 9B is a cross-section of an alternative embodiment of the battery pack of the present invention shown in FIG. 7, taken along plane Y-Y of FIG. 8, where the resiliently-deformable (elastomeric) ribs are adhered to the sleeve member which surrounds the battery;

FIG. 11 a perspective exploded view of an alternative battery pack and battery container of the present invention, containing at least one battery and having lateral damping means to reduce lateral vibrational energy imparted on the battery;

FIG. 12 is a cross-section, taken along plane E-E of FIG. 11, where the resiliently-deformable (elastomeric) ribs are integral with the tube member, which is also elastomeric FIG. 13 is a cross-section, taken along plane F-F of FIG. 11, where the resiliently-deformable (elastomeric) ribs are integral with the tube member, which is also elastomeric and which surrounds the battery;

DETAILED DESCRIPTION OF SOME PREFERRED EMBODIMENTS

Battery power assemblies 12 are typically incorporated downhole in drill strings 15 for directional drilling, for the purpose of providing electrical energy to operate a stepper motor for operating a downhole mud pulser (not shown). The mud pulser, and in particular the stepper motor thereof, operates a servo valve (not shown) in a linear—back and forth direction so as to thereby open and close in coded sequence a main pressure valve (not shown) to thereby create pressure pulses for transmitting data received from downhole sensors, such as azimuth and inclination of the drill bit, uphole to a drilling operator to allow "steering" of the drill bit.

Battery packs 10 within said battery power assemblies 12 provide electrical power to power downhole electronic equipment for the mud pulser, namely electrical power for receiving data and encoding data sensed by various downhole sensors during drilling, such as azimuth and inclination of the drill bit, and converting same such to a series of electrical pulses to the stepper motor of the mud pulser. The stepper motor of the mud pulser then causes encoded pressure pulses containing such data to travels uphole where it is sensed and decoded and provided in real time to the drill operator.

Figure 1:
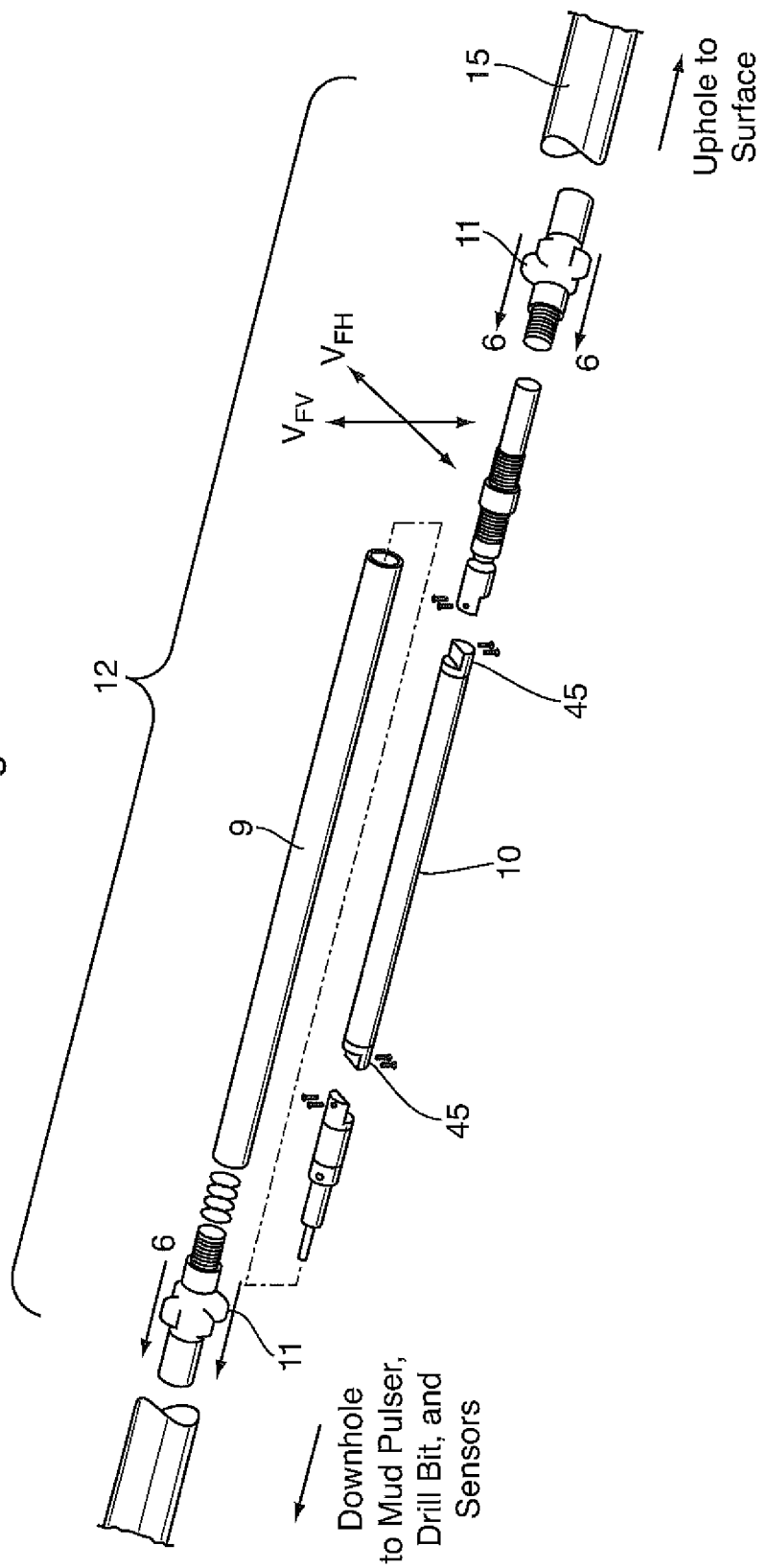
FIG. 1 is an exploded perspective view of a downhole battery environment in a tubing string for the battery pack, battery container, and battery of the present invention.

FIG. 1 shows an exploded perspective view of one such battery power assembly 12 in a drill/tubing string 15, for containing the battery pack 10 of the present invention, located downhole in a wellbore.

As may be seen from FIG. 1, the battery pack 10 of the present invention [which may further contain therewithin a specialized battery container 14 (not visible in FIG. 1, but clearly shown in exploded view in FIG. 2A) and/or one or more specially-configured batteries 16 (not visible in FIG. 1 but see for example FIG. 4A)] is typically located co-axially in a drill string 15.

During drilling operations, pressurized fluid such as drilling mud 6 typically flows downhole in drill string 15 via the interstitial area between the exterior of a cylinder 9 (in which the battery pack 10 is inserted) and the interior of drill string 15, to a drill bit motor (not shown) to hydraulically power such drill bit motor. Centralizers 11 on both the uphole and downhole side of cylinder 9 are typically used to maintain the battery power assembly 12 co-axial within drill string 15.

Due to the rapid opening and closing of main pressure valve and created pressure pulses, and also due to action of the drill bit and oscillatory lateral movement of the drill string within a wellbore (not shown), battery power assemblies 12 and in particular batteries 16 contained within a battery pack 10 are continually subject to high lateral vibratory forces, the vertical and horizontal force components thereof referred to as VFH and VFV respectively and as shown in FIG. 1.

Figure 2:
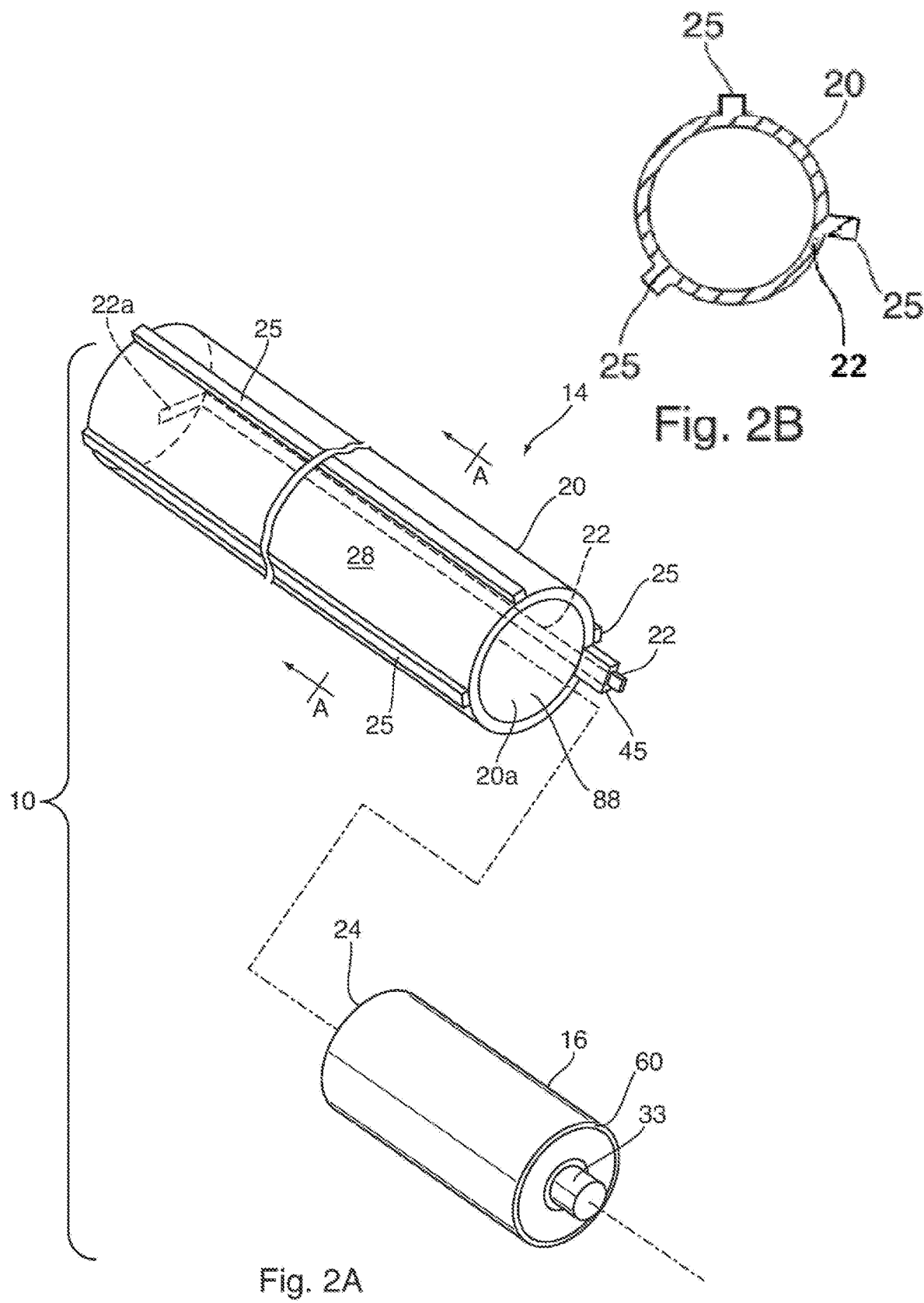
FIG. 2A is an exploded perspective view of a battery container and battery pack of the present invention, containing at least one battery and having lateral damping means to reduce lateral vibrational energy imparted on the battery.
FIG. 2B is a cross-section through the battery container, taken along plane A-A of FIG. 2A.

FIGS. 2A & 2B show a first embodiment of the battery container 14 of the present invention, which with battery 16 forms a first embodiment of the battery pack 10 of the present invention.

In this embodiment, battery container 14 comprises an elongate, cylindrical hollow tube 20 adapted to contain therewithin said at least one cylindrical battery 16. Elongate hollow tube 20 possesses at least one elongate electrically-conductive member 22 extending longitudinally along a length of elongate hollow tube 20. As shown in FIG. 2A, electrically-conductive member 22 is adapted at a distal end 22a thereof to be in electrical communication with one electrical contact 24 of said at least one cylindrical battery 16 when said at least one cylindrical battery 16 is inserted in elongate hollow tube 20.

Electrically-conductive member 22 may be adhered to the interior or exterior of tube 20, or may be integrally molded therewith, as shown in FIG. 2A. Electrically conductive member 22, and distal electrical contact 22a thereof, allows the positive or negative charge of the battery 16, as the case may be, at a distal end 24 of battery 16 to be conveyed to a common end of the battery container 20, such as proximal end 33 of battery 16 and proximal end 20a of tube 20 (typically the downhole end of such battery compartment 20), where such positive and negative charges may then be together conveyed via an insulated "bayonet" type electrical connector 45 or the like, to downhole componentry within the drill string, such as to the stepper motor of a mud pulser.

Distal electrical contact 22a may further exerting a force against said at least one battery 16 for damping longitudinal vibrations exerted on said at least one battery 16 when located in said battery container 20. Distal electrical contact 22a may further be a helical spring.

In the embodiment shown in FIG. 2A, electrically-conductive member 22 comprises a thin, flat, elongate ribbon-like member formed from a flat sheet of conductive metal, which is particularly suited to taking up a small height and is thus suited to be integrally moulded into tube member 20. Other configurations for the electrically-conductive member 22, such as an elongate wire adhered to or moulded within tube 20, may be used, and will now occur to persons of skill in the art.

Significantly, a plurality of resiliently-deformable protruding rib members 25 are provided.

In the embodiment shown in FIGS. 2A & 2B resiliently-deformable protruding rib members 25 are uniformly disposed about or positioned along the exterior cylindrical periphery 28 of elongate hollow tube 20, each of said rib members 25 being of a thickness so as to extend uniformly radially outwardly from cylindrical periphery 28 of elongate hollow tube 20 and spaced about cylindrical periphery 28 of elongate hollow tube 20 as best shown in FIG. 2B. In the embodiment of FIGS. 2A & 2B, three (3) resiliently-deformable protruding rib members 25 are provided, but more may be provided, with each preferably extending d substantially a length of elongate hollow tube 20 and in mutual parallel arrangement with each other and uniformly spaced about the exterior cylindrical periphery 28 of elongate hollow tube 20. By having resiliently-deformable protruding rib members 25 extend longitudinal (i.e. in the same direction as the batteries 16 are inserted in battery container 20, such configuration allows longitudinal venting of air when the batteries 16 are inserted in tube 20 and thus has the benefit of allowing easier installation of battery 16 within tube 20 by avoiding "swabbing" of the battery and trapping of air which would otherwise occur if the resiliently-deformable protruding rib members 25 were annular rings, as shown in FIG. 3, which trapping of air would impede insertion of the batteries 16 within tube 20 unless air vent holes were further included in periphery of tube 20.

The resiliently-deformable protruding rib members 25 are preferably formed from a two-part silicone rubber composition comprising a base and a curing agent. In a preferred embodiment, a material therefor which has been found suitable is a two-part silicone rubber composition formed from ZIAMETER[2] RTV-4130-J base and ZIAMETER[3] RTV-4130 curing agent, which when mixed forms a resiliently-deformable, waterproof, electrically non-conductive conductive flexible material.

[2] Registered trademark of Dow Corning Corporation for a two-part silicon rubber supplied as a pourable fluid that cures to a firm flexible elastomer
[3] Registered trademark of Dow Corning Corporation for a two-part silicon rubber supplied as a pourable fluid that cures to a firm flexible elastomer As more fully explained below and as depicted in various embodiments, the resiliently-deformable protruding rib members 25 may be applied to for formed on the exterior encapsulating tube 60 of the battery 16, the interior and/or exterior of an external sleeve 30 which may surround battery 16, and/or to the exterior or interior of tube 20, to provide the required lateral vibrational damping of batteries 16 forming part of battery pack 10.

Figure 3:
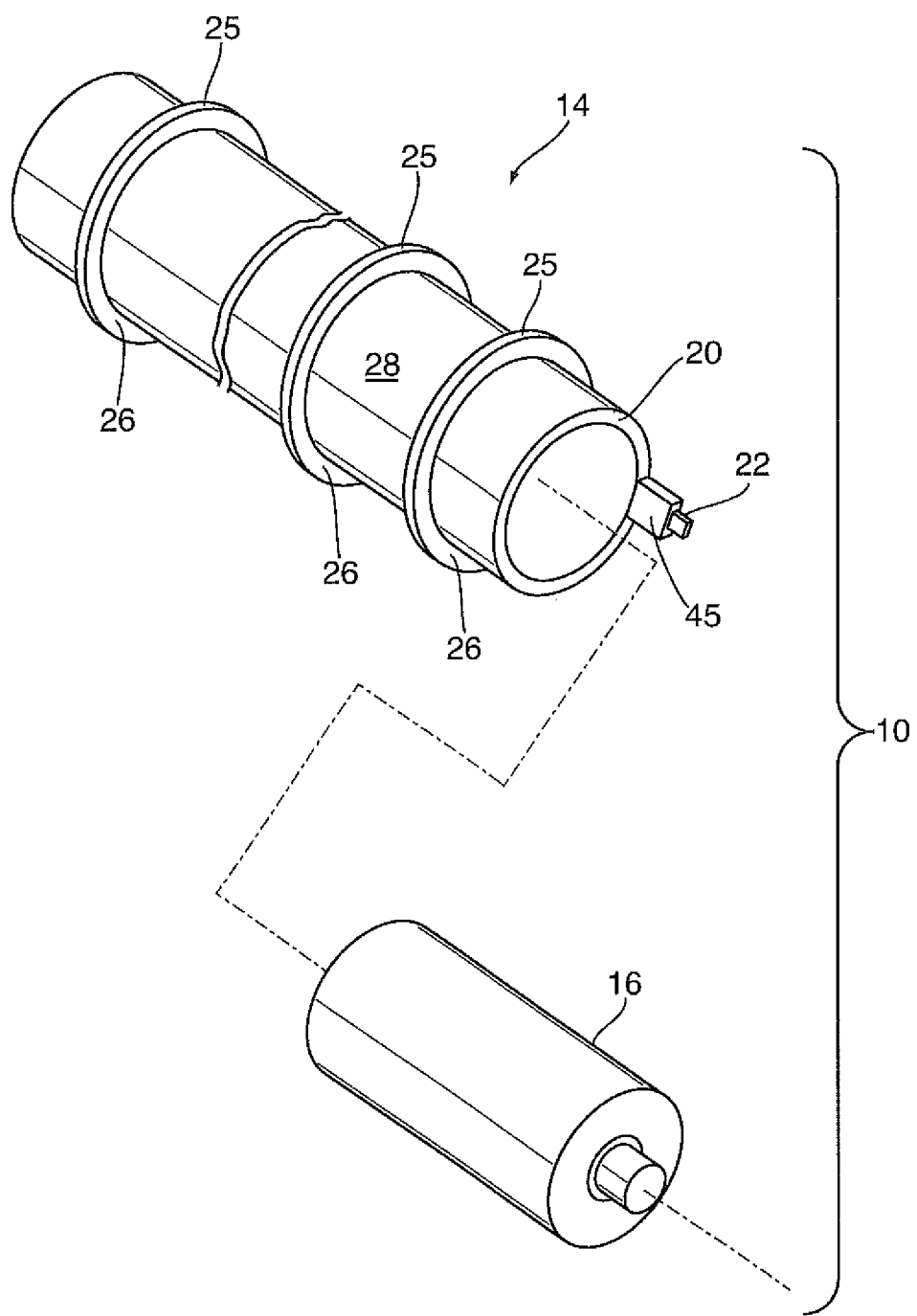
FIG. 3 is an exploded perspective view of another alternative battery container of the present invention, containing at least one battery and having lateral damping means to reduce lateral vibrational energy imparted on the battery.

FIG. 3 shows an alternative arrangement of the battery container 14 of the present invention, which with battery 16 forms a second embodiment of the battery pack 10 of the present invention.

In such embodiment, a series of resiliently-deformable protruding rib members 25, in the form of a plurality of annular rings 26, are disposed about the cylindrical periphery 28 of elongate tube 20, and extend uniformly radially outwardly from cylindrical periphery 28 of tube 20, and spaced longitudinally along cylindrical periphery 28. As noted above, air vent holes (not shown) may further be included in periphery of tube 20, to ease the insertion of so-formed batteries 16 within tube 20 and prevent swabbing of interior of tube 20.

Again, an electrically-conductive member 22 is provided as shown, which may be adhered to the interior or exterior of tube 20 or may be integrally molded therewith. Such allows the positive or negative charge of the battery 16, as the case may be, to be conveyed to a common end of the battery container 20, typically a downhole end of such battery compartment 20, where such positive and negative charges may then be conveyed, by means of an insulated "bayonet" type electrical connector or the like, to downhole componentry within the drill string, such as to the stepper motor of the mud pulser.

Again, electrically-conductive member 22 is provided at a distal end with an electrical contact 22a to be in electrical communication with one electrical contact 24 of at least one cylindrical battery 16 when such cylindrical battery 16 is inserted in elongate hollow tube 20.

In a further alternative embodiment to the embodiments of the battery compartment shown in FIG. 2A and FIG. 3, a single resiliently-deformable rib member 25, in the form of a helical member spirally around a cylindrical periphery of said battery container 20, of a thickness so as to extend uniformly radially outwardly or inwardly from said outer or inner cylindrical periphery 28, 88 respectively of battery container 20 (i.e. hollow elongate tube 20) may be provided.

Figures 4A, 4B:
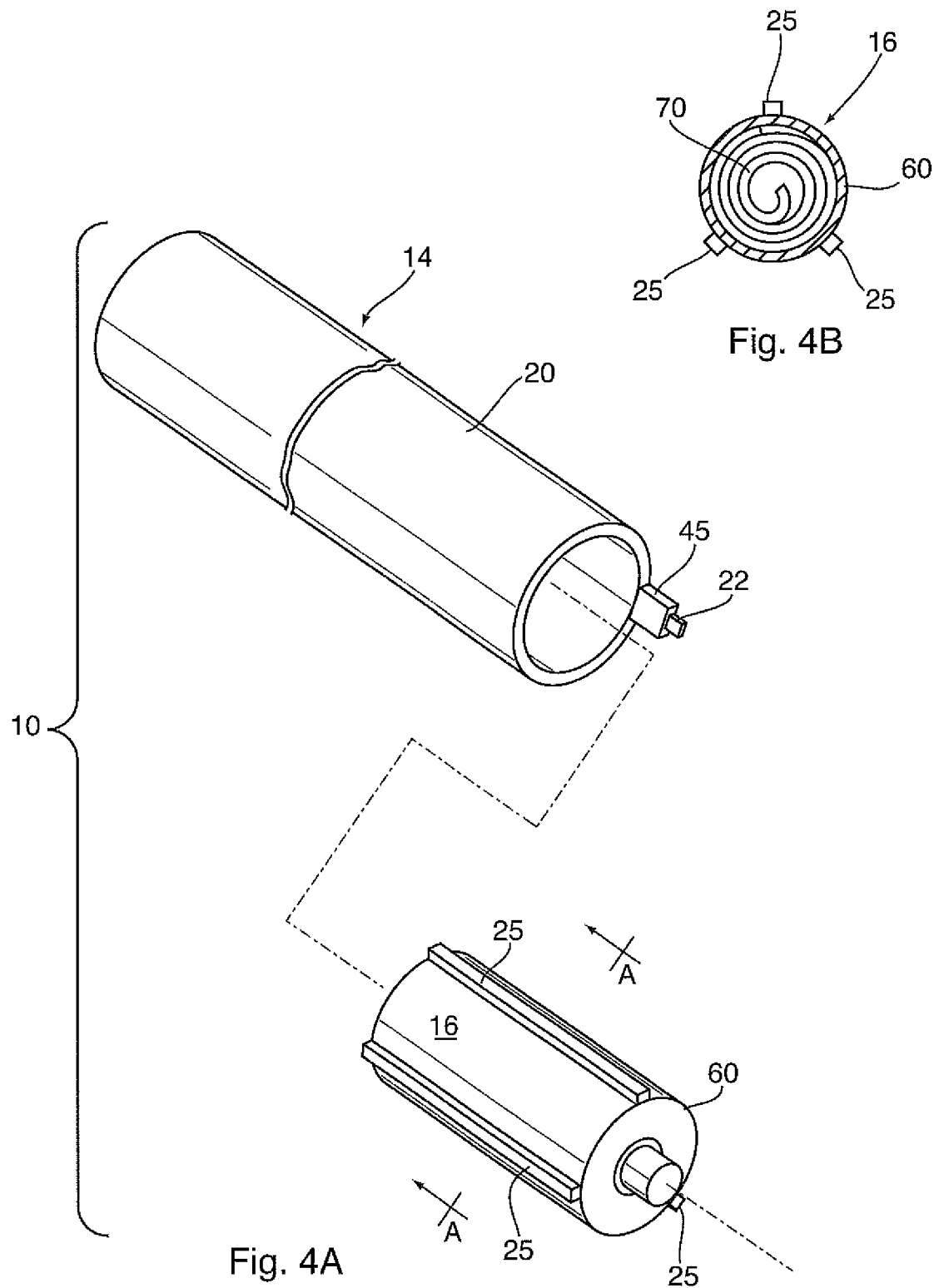
FIG. 4A is an exploded perspective view of another alternative battery container and battery pack of the present invention, containing at least one battery and having lateral damping means to reduce lateral vibrational energy imparted on the battery, wherein the lateral damping means comprises elongate resiliently-deformable rib members adhered to the encapsulating tube of the battery.
FIG. 4B is a cross-section through the battery container, taken along plane A-A of FIG. 4A.

FIG. 4A shows another permutation of the present invention. Instead of resiliently-deformable longitudinally-extending protruding rib members 25 being situated on an interior and/or exterior of battery container (i.e. tube 20) as shown in FIG. 2A, FIG. 6A, FIG. 7A, FIG. 8 and FIG. 11, in the embodiment shown in FIG. 4A a plurality of and preferably three (3) or more) resiliently-deformable protruding rib members 25 are directly adhesively secured to the metal encapsulating tube 60 which surrounds the oxidative and reductive spiral layers 70 of each battery 16, as shown in FIG. 4B. So-modified battery 16 or batteries, when inserted in battery container 20 and thereby forming battery pack 10 and inserted downhole, will then have the resiliently-deformable longitudinally-extending protruding rib members 25 effectively damping lateral vibratory forces exerted on one or of batteries 16, thereby reducing incidence of structural damage or explosion of battery (ies) 16.

Figure 5:
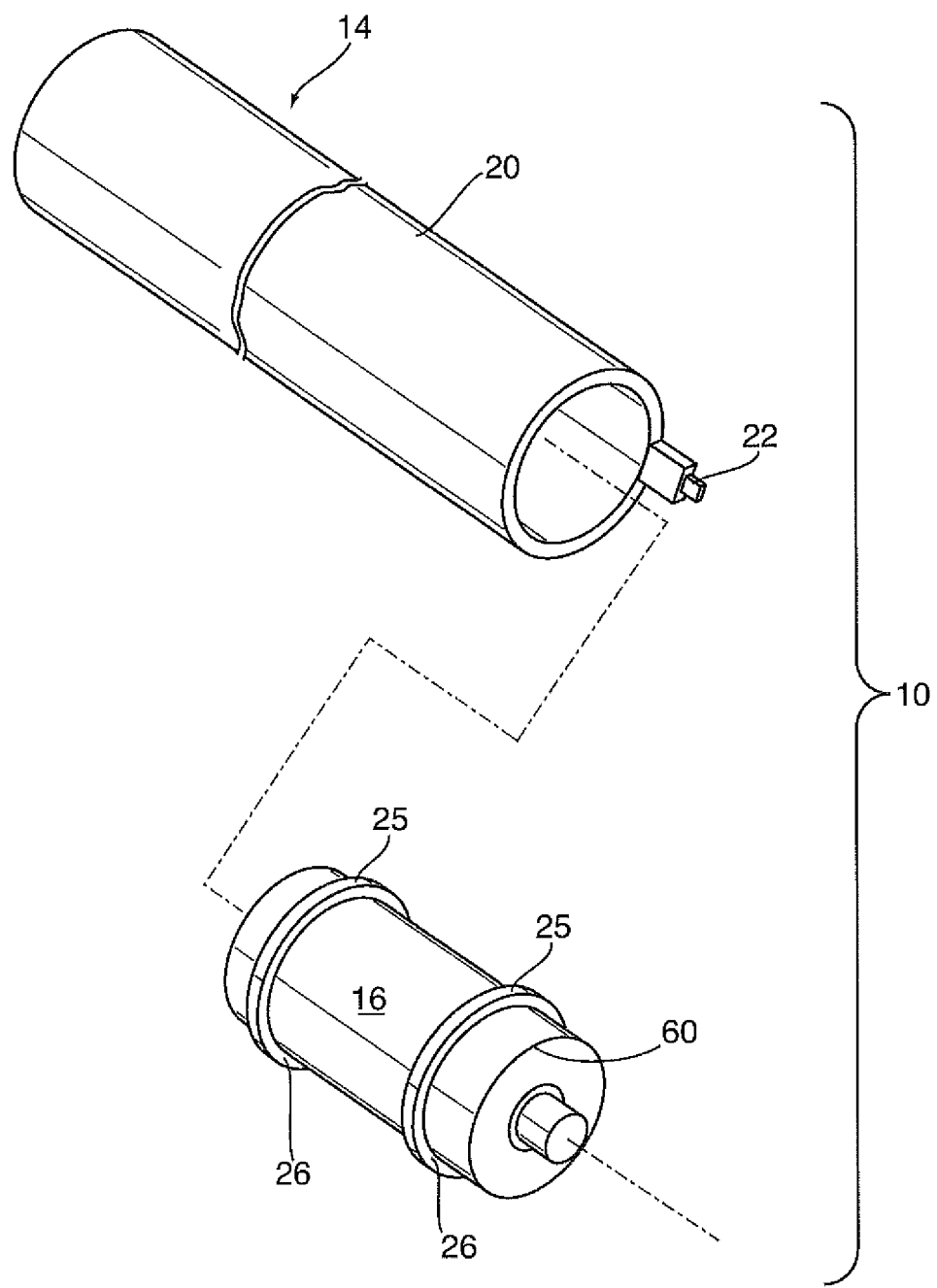
FIG. 5 is an exploded perspective view of another alternative battery pack of the present invention, containing at least one battery and having lateral damping means to reduce lateral vibrational energy imparted on the batter, wherein the lateral damping means consists of a plurality of annular rings spaced along a periphery of the battery.

FIG. 5 shows another permutation of the present invention. Instead of resiliently-deformable protruding rib members 25 which are longitudinally extending and situated on an interior and/or exterior of battery container (tube 20) as shown inter alia in FIG. 2A, FIG. 6A, FIG. 7A, FIG. 8 and FIG. 11, resiliently-deformable protruding rib members 25 are in the form of a plurality of elastomeric annular rings 27 which may fitted around and/or adhesively secured to the encapsulating tube 60 of battery 16. So-modified battery 16 or batteries, when inserted in battery container 20 and thereby forming battery pack 10 and inserted downhole, will then have the elastic annular rings 27 effectively damping lateral vibratory forces exerted on one or of batteries 16, thereby reducing incidence of structural damage or explosion of battery (ies) 16.

FIG. 6A (together with cross-sections FIGS. 6B, 6C), FIG. 7A (together with cross-sections FIGS. 7B, 7C), FIG. 8 (together with cross-sections FIGS. 9A, 9B), FIG. 11 (together with cross-sections FIGS. 12 & 13), and FIGS. 17-19 all show various additional embodiments of the battery pack 10 of the present invention where in each case a thin cylindrical hollow sleeve 30 having resiliently-deformable protruding rib members 25 thereon is provided which is adapted in an assembled battery pack 10 to be situated between an exterior of each of the one or more batteries 16 and the interior cylindrical periphery 88 of battery container (i.e. tube) 20.

Hollow tubular sleeve 30 extending a length of battery container 20, or alternatively or a plurality of tubular sleeves 30 each adapted when inserted in battery container 20 to overlie respective batteries 16, may be advantageously employed where one or more of the following scenarios apply: i) a field service company may wish to retrofit an existing battery pack where neither the pre-existing battery container 20 or battery 16 are provided with resiliently-deformable protruding rib members 25, so as to thereby provide such battery pack with lateral damping capability to provide resistance to lateral vibrations; (ii) additional damping capability is desired to be provided in addition to whatever resiliently-deformable protruding rib members 25 having been provided on battery container 20 and/or battery 16, to provide additional vibration-withstanding capability for an existing battery pack; and/or (iii) fabrication of exterior or interior resiliently-deformable protruding rib members 25 on a separate component such as thin hollow sleeve 30 may be easier and less time consuming than alternatively forming said resiliently-deformable protruding rib members 25 on the interior cylindrical periphery 88 of elongate battery container 20 and/or adhesively applying said resiliently-deformable protruding rib members 25 on an exterior of encapsulating tube 60 of battery 16.

Other and additional advantages of utilizing a separate thin hollow sleeve component 30 as part of battery pack 10 will further now occur to persons of skill in the art.

Hollow sleeve 30 may be of a separate cast or formed material, with resiliently-deformable protruding rib members 25 adhesively applied thereto, either to the exterior of thin tubular sleeve 30 (as shown in FIGS. 6A & 6C) and/or the interior thereof (as shown in FIG. 7A & FIG. 8).

Alternatively, resiliently-deformable protruding rib members 25 may be integrally cast with hollow sleeve 30. Such manner of forming hollow sleeve 30 is preferred, as such offers additional lateral vibration damping in the region of the intersection of the resiliently-deformable protruding rib members 25 with the cylindrical periphery of hollow sleeve 30, and avoids a further manufacturing step of having to otherwise form and secure the resiliently-deformable protruding rib members 25 to hollow sleeve 30. Such is further preferred in that the hollow sleeve 30 and resiliently-deformable protruding rib members 25 may be together formed from a mold, using a two-part silicone rubber composition, such as but not limited to the aforementioned ZIAMETER[4] RTV-4130-J base and ZIAMETER[5] RTV-4130 curing agent, which when injected in a mould thereby form a resiliently-deformable, waterproof, electrically non-conductive flexible hollow sleeve 30, having resiliently-deformable protruding rib members 25 integrally formed thereon of a suitable modulus of elasticity to provide vibration absorption an damping.

[4] Registered trademark of Dow Corning Corporation for a two-part silicon rubber supplied as a pourable fluid that cures to a firm flexible elastomer
[5] Registered trademark of Dow Corning Corporation for a two-part silicon rubber supplied as a pourable fluid that cures to a firm flexible elastomer Specifically, as regards FIG. 6A-C, such shows an embodiment whereby a thin cylindrical sleeve 30 is provided having longitudinally resiliently-deformable protruding rib members 25 thereon. Where tube 20 already has a plurality of resiliently-deformable protruding rib members 25 arranged about the exterior cylindrical periphery 28 thereof as shown, additional resiliently-deformable protruding rib members 25 on cylindrical hollow sleeve 30 provide additional lateral damping of batteries 16 when sleeve 30 and batteries are together placed in battery container 20 and the resulting battery pack 10 placed downhole.

Alternatively, in a further modification, battery container 20 need not possess any resiliently-deformable protruding rib members 25, and instead resiliently-deformable protruding rib members 25 may be situated on or integrally formed in sleeve 30 so as to provide the necessary lateral vibration damping to batteries 16.

In the embodiment shown in FIG. 6A, resiliently-deformable protruding rib members 25 are adhesively adhered to the outer cylindrical periphery of hollow sleeve 30 as may be seen from FIG. 6C, and are integrally formed in the exterior cylindrical periphery 28 of battery container 20, as may be seen from FIG. 6B. This configuration may be reversed, or all may be integrally formed, or all may be adhesively attached to the respective battery container 20 or hollow sleeve 30.

Likewise, resiliently-deformable protruding rib members 25, whether integrally or adhesively affixed, may be provided on either or both of the exterior cylindrical periphery 28 and interior cylindrical periphery 88 of battery container 20, and/or on the exterior cylindrical periphery or the interior cylindrical periphery of sleeve 30.

For example, as an illustration of one of the aforesaid configurations and as shown in FIG. 7A, resiliently-deformable protruding rib members 25 are provided on both the interior cylindrical surface 88 of battery container 20, and on the interior cylindrical surface of sleeve 30. As seen from FIG. 7C, resiliently-deformable protruding rib members 25 are integrally formed with battery container 20, while as seen from FIG. 7B, resiliently-deformable protruding rib members 25 are adhesively secured to sleeve 30.

FIG. 8 and FIGS. 9A, 9B show an alternative embodiment/combination, wherein resiliently-deformable protruding rib members 25 are provided only on interior cylindrical periphery 88 of battery container 20, and integrally formed therewith. Conversely, resiliently-deformable protruding rib members 25 are further applied to both the interior cylindrical periphery and exterior cylindrical periphery of sleeve 30, and adhesively affixed thereto, as may be seen from FIG. 9B.

FIGS. 11-13 show an alternative embodiment/combination, wherein resiliently-deformable protruding rib members 25 are provided on both the interior cylindrical periphery and exterior cylindrical periphery of sleeve 30, and adhesively adhered to such peripheries as shown in FIG. 13. Likewise, resiliently-deformable protruding rib members 25 are further applied to both the interior cylindrical periphery 88 and exterior cylindrical periphery of battery container 20 and integrally formed therewith, as may be seen from FIG. 12.

Figure 10:
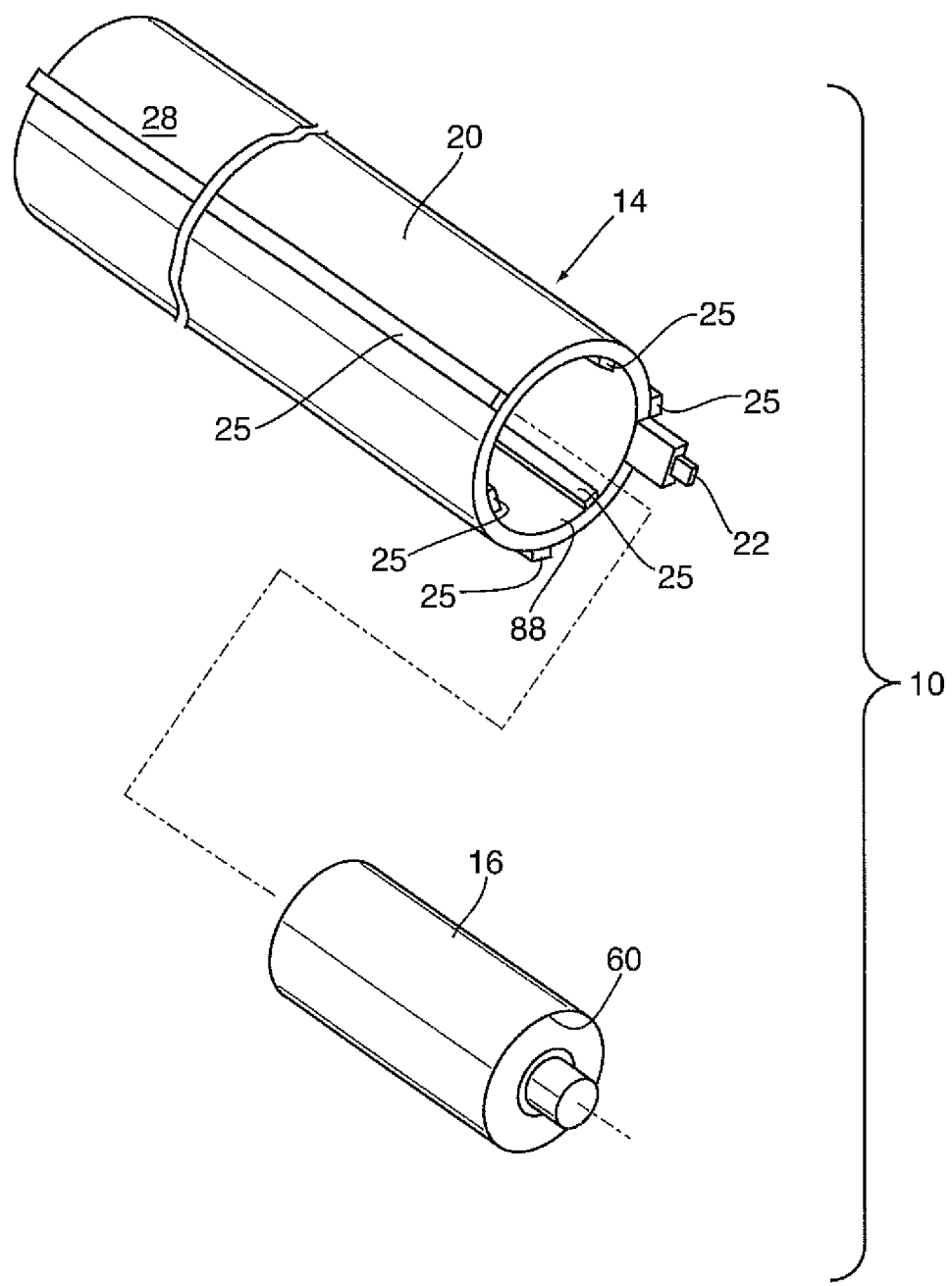
FIG. 10 is a perspective exploded view of an alternative battery pack and battery container of the present invention, containing at least one battery, said battery pack and battery container having lateral damping means to reduce lateral vibrational energy imparted on the battery.

FIG. 10 shows yet another embodiment of the invention, where no sleeve 30 is employed. Instead, battery container 20 has resiliently-deformable protruding rib members 25 on both the interior cylindrical periphery 88 and exterior cylindrical periphery of battery container 20. Such resiliently-deformable protruding rib members 25 may be separately formed and adhesively attached to battery container 20, or alternatively integrally formed therewith in the manner above described. When battery 16 is inserted in battery container 20, the resultantly-formed battery pack 10 provides vibrational damping and vibrational absorption of vibrational energies which would otherwise be exerted on the batteries 16 therein when the battery pack 10 is placed downhole and exposed to vibrations.

Figure 14:
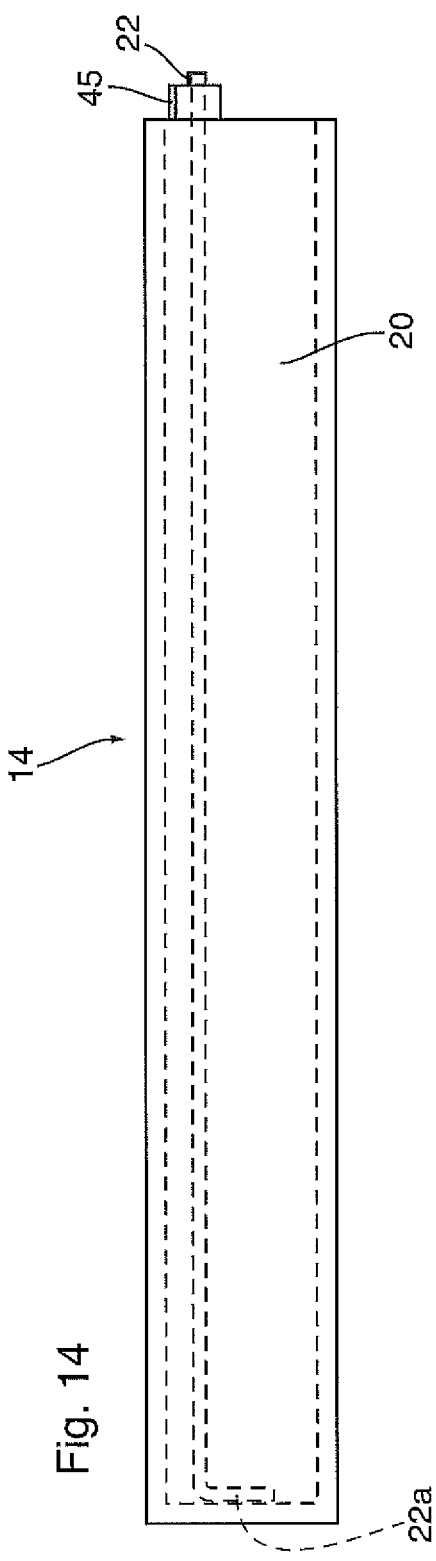
FIG. 14 is a partial phantom side elevation view of one embodiment of a battery pack of the present invention (elastomeric ribs not shown)

FIG. 14 shows a cross-sectional side elevation view of battery container 20, without batteries 16 located therein, showing to advantage the electrically-conductive member 22 extending longitudinally the length thereof.

Figure 15:
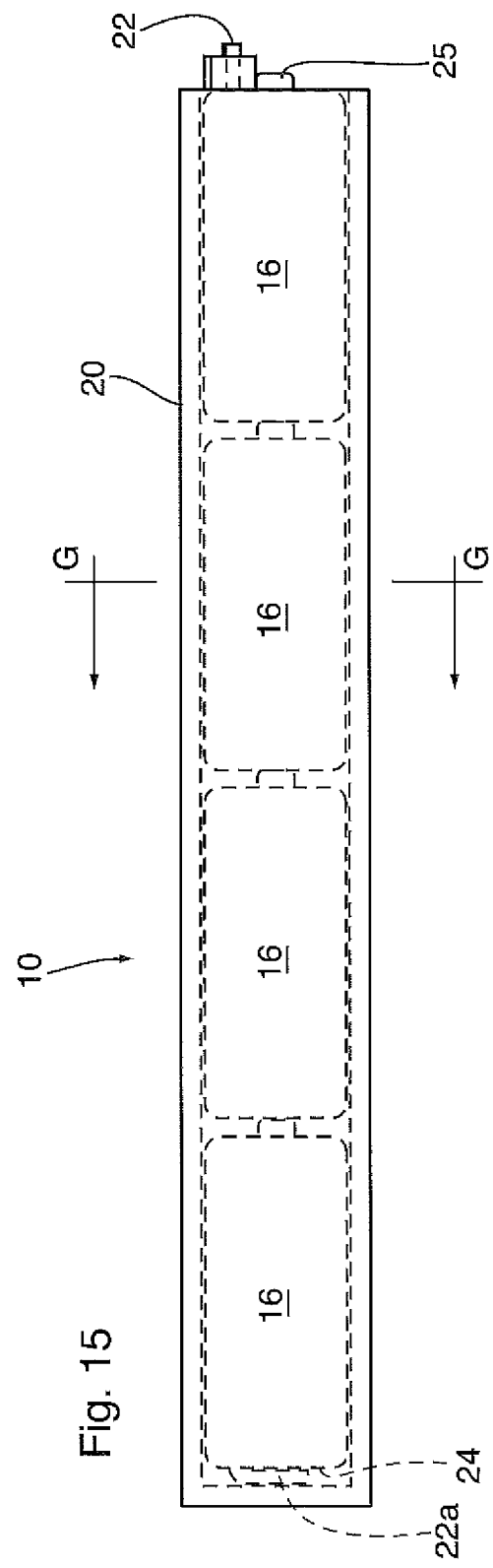
FIG. 15 is a similar partial-phantom side elevation view of the battery pack of the present invention (elastomeric ribs not shown)

FIG. 15 is a similar cross-sectional side elevation view of battery container 20, with batteries 16 inserted therein.

FIGS. 16A-F show various cross-sectional views along plane G-G of battery pack 10 of FIG. 15, when the battery pack 10 shown in FIG. 15 is of various configurations.

Figure 16A:
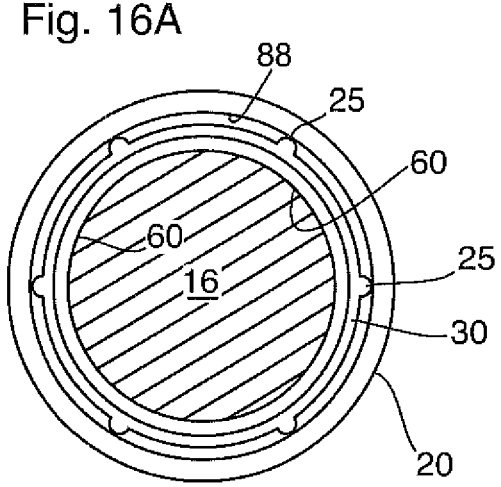
FIG. 16A is a cross-section, taken along plane G-G of FIG. 15, of an embodiment of the invention where the resiliently-deformable (elastomeric) ribs are on the exterior of the tube member which surrounds the battery, and are situated in the battery compartment.

For example, FIG. 16A shows a cross-section along plane G-G of battery pack 10 of FIG. 15, wherein a sleeve 30, with resiliently-deformable protruding rib members 25 on the exterior cylindrical periphery thereof, is interposed between the encapsulating metal exterior tube 60 of battery 16 and the interior cylindrical periphery 88 of battery container 20.

Figure 16D:
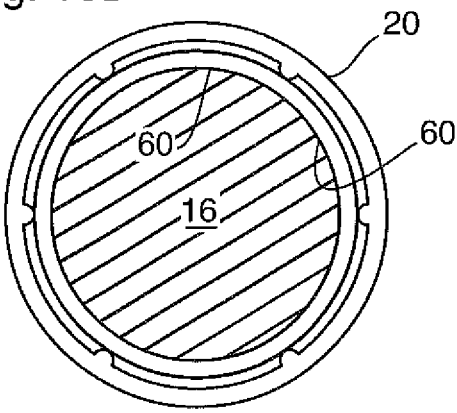
FIG. 16D is a cross-section, taken along plane G-G of FIG. 15, of an embodiment of the invention where the resiliently-deformable (elastomeric) ribs are situated on the interior of the battery container.
Figure 16B:
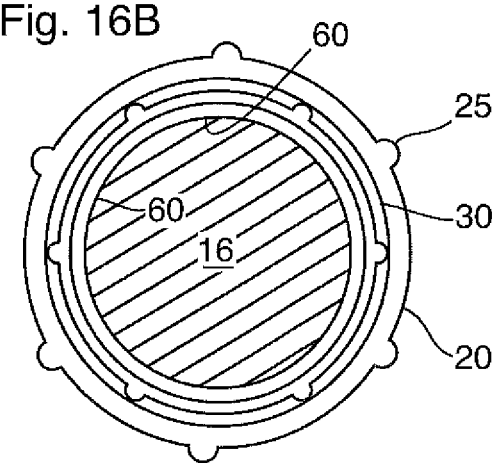
FIG. 16B is a cross-section, taken along plane G-G of FIG. 15, of an embodiment of the invention where the resiliently-deformable (elastomeric) ribs are on the exterior of the tube member which surrounds the battery, and are also situated on the exterior of the battery container.

FIG. 16B shows a cross-section along plane G-G of battery pack 10 of FIG. 15, wherein a sleeve 30, with resiliently-deformable protruding rib members 25 on the exterior cylindrical periphery thereof, is interposed between the encapsulating metal exterior tube 60 of battery 16 and the interior cylindrical periphery 88 of battery container 20. Resiliently-deformable protruding rib members 25 are further provided on the exterior periphery 28 of battery container 20.

Figure 16E:
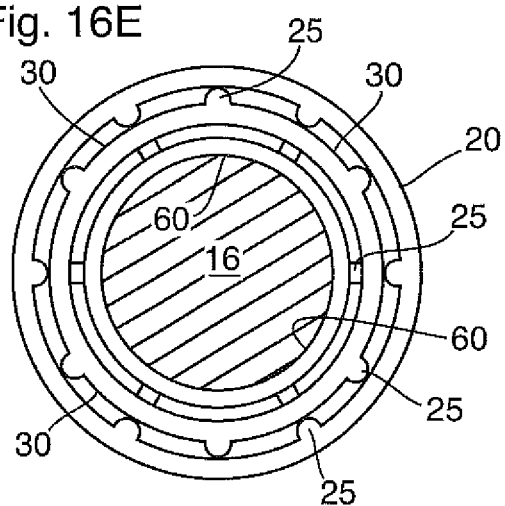
FIG. 16E is a cross-section, taken along plane G-G of FIG. 15, of an embodiment of the invention where the resiliently-deformable (elastomeric) ribs are situated on both the exterior and interior of the tube member which surrounds the battery, and are also situated on the interior of the battery container.
Figure 16C:
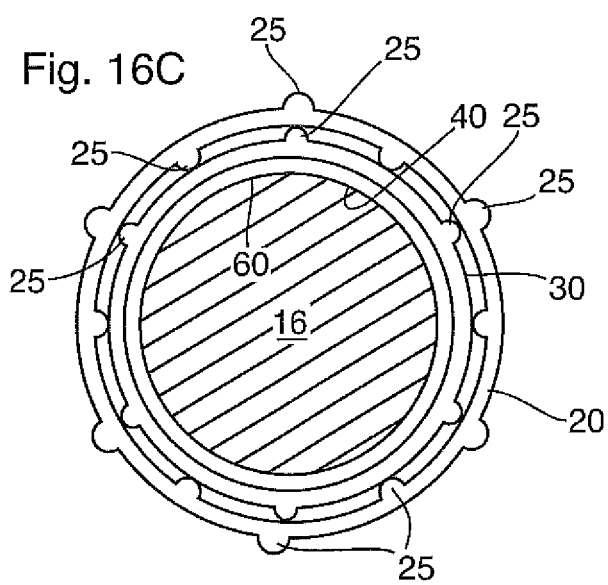
FIG. 16C is a cross-section, taken along plane G-G of FIG. 15, of an embodiment of the invention where the resiliently-deformable (elastomeric) ribs are on the exterior of the tube member which surrounds the battery, and are also situated on the interior of the battery container.

FIG. 16C shows a cross-section along plane G-G of battery pack 10 of FIG. 15, wherein a sleeve 30, with resiliently-deformable protruding rib members 25 on the exterior cylindrical periphery thereof, is interposed between the encapsulating metal exterior tube 60 of battery 16 and the interior cylindrical periphery 88 of battery container 20. Resiliently-deformable protruding rib members 25 are further provided on both the exterior periphery 28 of battery container 20, as well as on the interior periphery 88 of battery container 20.

FIG. 16D shows a cross-section along plane G-G of battery pack 10 of FIG. 15, wherein resiliently-deformable protruding rib members 25 are provided only on the interior periphery 88 of battery container 20.

FIG. 16E shows a cross-section along plane G-G of battery pack 10 of FIG. 15, wherein a sleeve 30, with resiliently-deformable protruding rib members 25 on both the exterior and interior cylindrical periphery thereof, is interposed between the encapsulating metal exterior tube 60 of battery 16 and the interior cylindrical periphery 88 of battery container 20. Resiliently-deformable protruding rib members 25 are further provided on the interior periphery 88 of battery container 20.

Figure 16F:
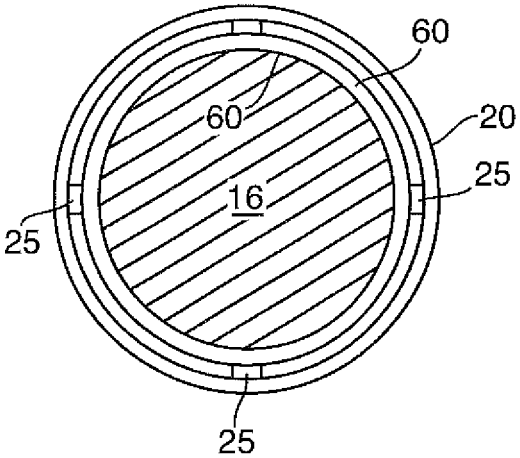
FIG. 16F is a cross-section, taken along plane G-G of FIG. 15, of an embodiment of the invention where the resiliently-deformable (elastomeric) ribs are situated on the exterior of the battery.

FIG. 16F shows a cross-section along plane G-G of battery pack 10 of FIG. 15, wherein resiliently-deformable protruding rib members 25 are provided only on the exterior of encapsulating metal tube 60 of battery 16.

Figure 17:
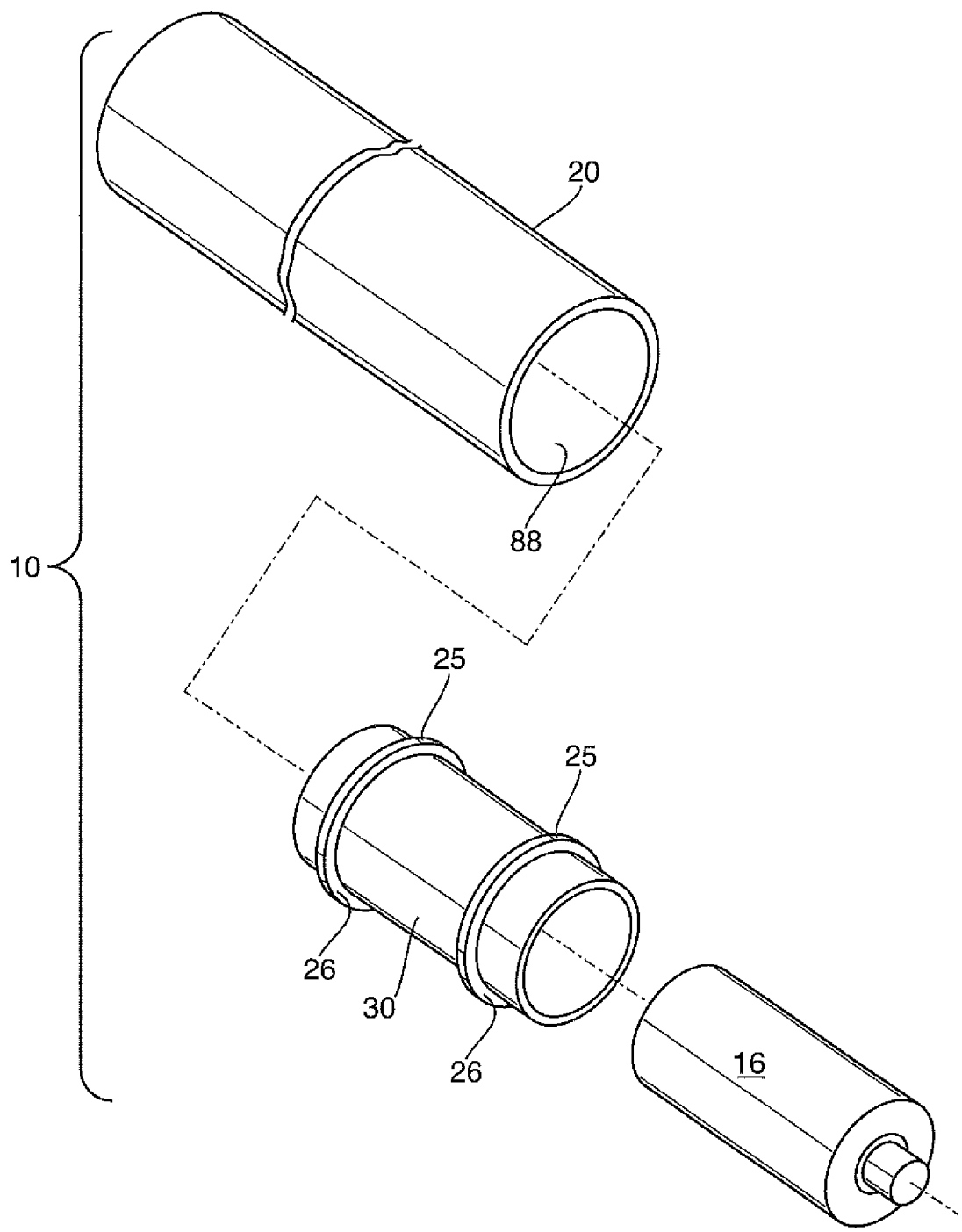
FIG. 17 is a perspective exploded view of an alternative battery pack and battery container of the present invention, containing at least one battery, said battery pack and battery container having lateral damping means to reduce lateral vibrational energy imparted on the battery, wherein the lateral damping means consists of a plurality of annular resiliently-deformable rings situated about a periphery of a tubular member and longitudinally spaced therealong.

FIG. 17 shows another variation (exploded view) of the battery pack 10 of the present invention. In such embodiment, a thin hollow tubular sleeve 30 is provided with a plurality of resiliently-deformable protruding rib members 25. In this embodiment the resiliently-deformable protruding rib members 25 are in the form of annular rings 26 which are disposed and spaced longitudinally along the length and outer cylindrical periphery of sleeve 30. The annular rings 26 may be separately formed, and applied to the cylindrical periphery of sleeve 30, which may thus be formed of a different, and no-resiliently deformable material. Alternatively, and preferably, the annular rings 26 and sleeve 30 are integrally formed or moulded, and are formed of a resiliently-deformable material, such as a two-part silicone rubber composition, such as but not limited to the aforementioned ZIAMETER[6] RTV-4130-J base and ZIAMETER[7] RTV-4130 curing agent. When one or more cylindrical batteries 16 are inserted in sleeve 30 and such assembly inserted in battery container 20 so as to form a battery pack 10, annular rings 26 contact interior cylindrical periphery 88 of battery container 20, and resiliently deform when vibratory forces are applied to battery pack 10 so as to reduce and damp vibratory forces applied to batteries 16.

Figure 19:
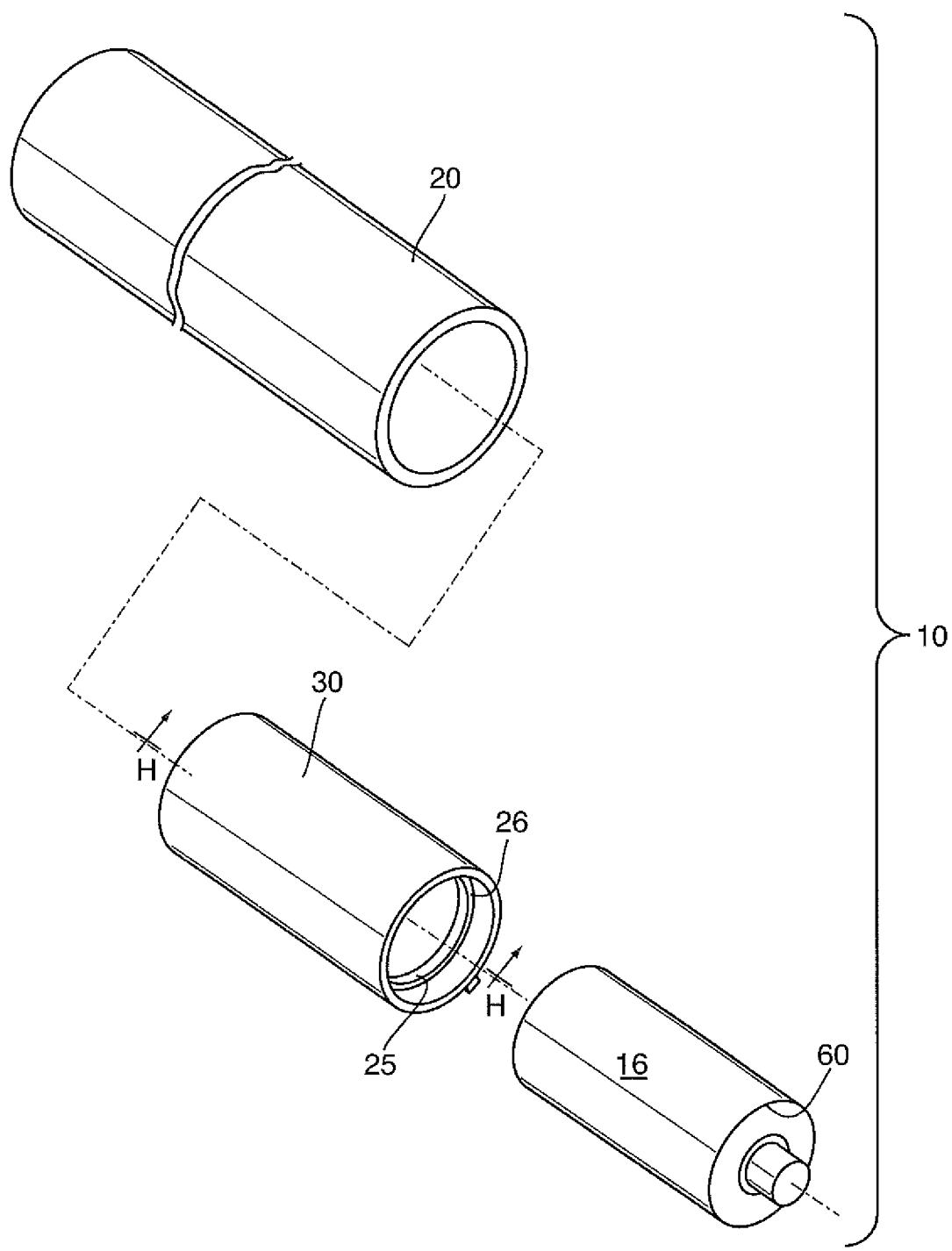
FIG. 19 is a perspective exploded view of an alternative battery pack and battery container of the present invention, said battery container thereof having lateral damping means to reduce lateral vibrational energy imparted on the battery, wherein the lateral damping means consists of a plurality of annular rings spaced along an interior periphery of the battery container.

[6] Registered trademark of Dow Corning Corporation for a two-part silicon rubber supplied as a pourable fluid that cures to a firm flexible elastomer
[7] Registered trademark of Dow Corning Corporation for a two-part silicon rubber supplied as a pourable fluid that cures to a firm flexible elastomer FIG. 19 shows another variation (exploded view) of the battery pack 10 of the present invention. In such embodiment, a thin hollow tubular sleeve 30 is provided with a plurality of resiliently-deformable protruding rib members 25. In this embodiment the resiliently-deformable protruding rib members 25 are in the form of annular rings 26 which are disposed and spaced longitudinally along the length and inner cylindrical periphery of sleeve 30. The annular rings 26 may be separately formed, and applied to the cylindrical periphery of sleeve 30, which may thus be formed of a different, and no-resiliently deformable material. Alternatively, and preferably, the annular rings 26 and sleeve 30 are integrally formed or moulded with sleeve 30, and are formed of a resiliently-deformable material, such as a two-part silicone rubber composition, such as but not limited to the aforementioned ZIAMETER[8] RTV-4130-J base and ZIAMETER[9] RTV-4130 curing agent. When one or more cylindrical batteries 16 are inserted in sleeve 30 and such assembly inserted in battery container 20 so as to form a battery pack 10, annular rings 26 contact interior cylindrical periphery 88 of battery container 20 and resiliently deform when vibratory forces are applied to battery pack 10 so as to reduce and damp vibratory forces applied to batteries 16.

Figure 20:
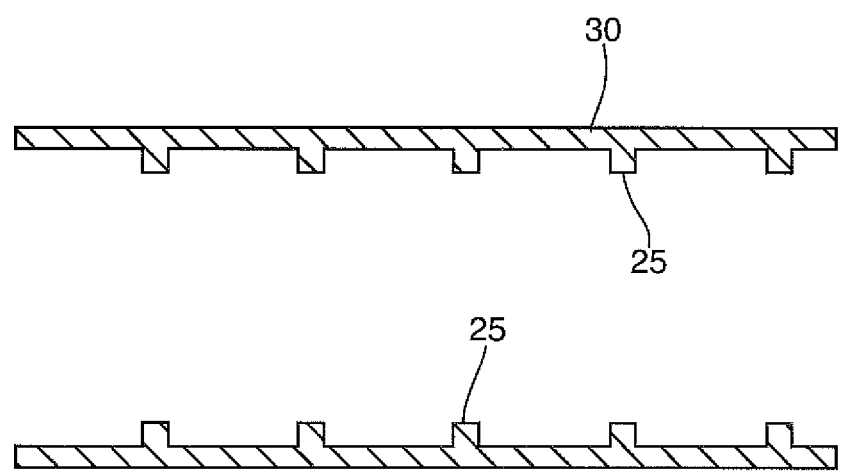
FIG. 20 is a cross-section, taken along plane H-H of FIG. 19, showing in cross-section the plurality of annular rings spaced along an interior periphery of the battery container.

[8] Registered trademark of Dow Corning Corporation for a two-part silicon rubber supplied as a pourable fluid that cures to a firm flexible elastomer
[9] Registered trademark of Dow Corning Corporation for a two-part silicon rubber supplied as a pourable fluid that cures to a firm flexible elastomer FIG. 20 shows a cross section of sleeve 30 taken along plane H-H of FIG. 19.

Figure 18:
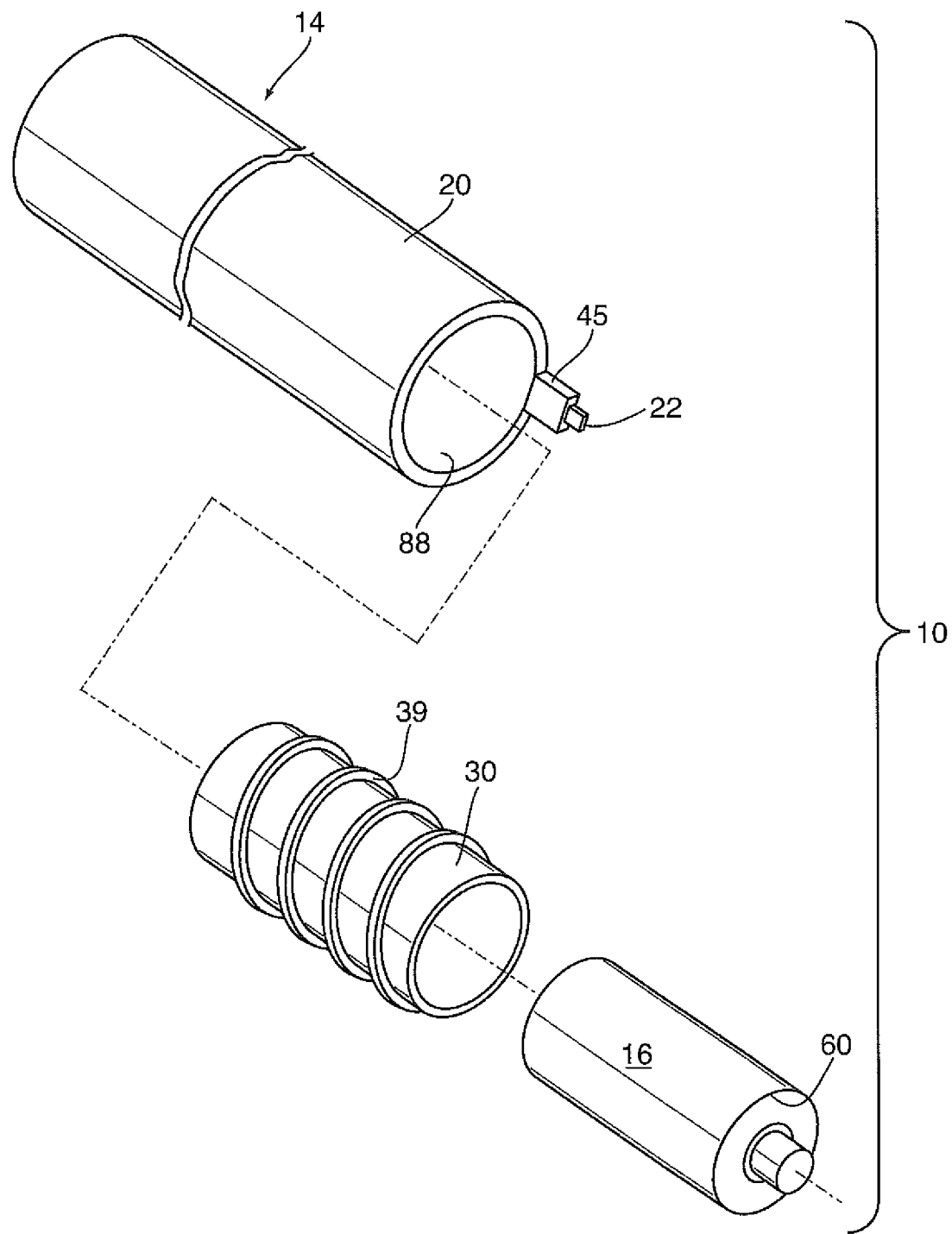
FIG. 18 is a perspective exploded view of an alternative battery pack of the present invention, containing at least one battery, said battery pack and battery container having lateral damping means to reduce lateral vibrational energy imparted on the battery, wherein the lateral damping means consists of a helical ring spirally wound about a periphery of a tubular member and longitudinally spaced therealong.

FIG. 18 shows yet another embodiment (exploded view) of the battery pack 10 of the present invention. In such embodiment, thin hollow tubular sleeve 30 is provided with a helical resiliently-deformable protruding rib member 39 disposed around an inner cylindrical periphery of sleeve 30, of a thickness so as to extend uniformly radially inwardly from the cylindrical periphery of sleeve 30. When one or more cylindrical batteries 16 are inserted in sleeve 30 and such assembly inserted in battery container 20 so as to form a battery pack 10, annular rings 26 contact interior cylindrical periphery 88 of battery container 20 and resiliently deform when vibratory forces are applied to battery pack 10 so as to reduce and damp vibratory forces applied to batteries 16.

For a complete definition of the invention and the intended scope thereof, reference is to be made to the summary of the invention and the appended claims, read together with and considered with the remaining disclosure as well as the drawings herein.

We claim:

1. An elongate cylindrical battery container for use in downhole in measurement-while-drilling operations which provides electrical power to a mud pulser and which battery container damps lateral vibration of at least one substantially cylindrical battery contained therein, comprising:
   (i) an elongate, electrically-insulative substantially cylindrical hollow tube adapted to contain therewithin said at least one cylindrical battery and adapted to be insertable and operate in a downhole environment within a drill string or tubing string in a wellbore being drilled;
   (ii) at least one elongate electrically-conductive member extending longitudinally along a length of said elongate hollow tube, adapted at one end thereof to be in electrical communication with one electrical contact of said at least one cylindrical battery when said at least one cylindrical battery is inserted in said elongate hollow tube, wherein said elongate electrically-conductive member is integrally molded within said elongate hollow tube and along substantially said length of said elongate hollow tube; and
   (iii) a first plurality of resiliently-deformable protruding rib members uniformly disposed about or positioned along an interior or exterior cylindrical periphery of said elongate hollow tube and extending along substantially said length of said elongate hollow tube, each of said rib members of a thickness so as to extend uniformly radially inwardly or outwardly a distance from said respective interior or exterior cylindrical periphery of said elongate hollow tube and spaced circumferentially about said interior or exterior cylindrical periphery of said elongate hollow tube, and adapted to be resiliently deformable in a downhole environment within a drill string or tubing string in a wellbore being drilled;
   (iv) at least one of said first plurality of resiliently-deformable protruding rib members situated on said interior or exterior cylindrical periphery at a location thereon proximate to or directly overlying said elongated electrically-conductive member molded therein, along substantially a length thereof.

2. The elongate cylindrical battery container as claimed in claim 1, wherein said resiliently-deformable rib members and said elongate hollow tube are each integrally formed and of a resiliently-flexible material.

3. The elongate cylindrical battery container as claimed in claim 1, wherein said resiliently-deformable rib members are separate from and non-integral with said elongate hollow tube.

4. The elongate cylindrical battery container as claimed in claim 1,
   wherein said first plurality of resiliently-deformable rib members are each in mutual parallel arrangement with each other and uniformly circumferentially spaced about said interior cylindrical periphery of said elongate hollow tube.

5. The elongate cylindrical battery container as claimed in claim 1, wherein said first plurality of resiliently-deformable protruding rib members are situated on said interior cylindrical periphery of said elongate hollow tube; and
   said elongate hollow tube further having an additional second plurality of resiliently-deformable protruding rib members situated on said exterior cylindrical periphery of said elongate hollow tube.

6. The elongate cylindrical battery container as claimed in claim 1,
   wherein said first plurality of resiliently-deformable rib members are disposed about or positioned along an exterior cylindrical periphery of said elongate hollow tube and in mutual parallel arrangement to each other and uniformly circumferentially spaced about said exterior cylindrical periphery of said elongate hollow tube.

7. The elongate cylindrical battery container as claimed in claim 1, wherein:
   each of said at least one cylindrical batteries are circumferentially surrounded about said cylindrical periphery thereof by a thin resiliently-deformable tubular sleeve;
   said thin resiliently-deformable tubular sleeve having a plurality of resiliently-deformable rib members integrally formed therewithin and disposed about an outer or inner cylindrical periphery of said thin resiliently-deformable sleeve along substantially a longitudinal length thereof; and wherein when a plurality of cylindrical batteries and associated thin resiliently-deformable sleeves are inserted in said elongate hollow tube and said elongate hollow tube inserted in measurement-while-drilling equipment and then inserted downhole, said first plurality of resiliently-deformable rib members on said elongate hollow tube and said second plurality of resiliently-deformable rib members situated on said associated thin resiliently-defomable tubular sleeve together absorb and damp lateral vibratory forces exerted on said elongate hollow tube and said cylindrical batteries contained therewithin.

8. The elongate cylindrical battery container as claimed in claim 1,
wherein said electrically-conductive member comprises a thin, flat, elongate ribbon member having a width substantially greater than a thickness thereof.

9. The elongate cylindrical battery container as claimed in claim 7, wherein said thin resiliently-deformable tubular sleeve and said second plurality of resiliently-deformable rib members thereon are formed together from a two- part silicone rubber composition comprising a base and a curing agent, said base when mixed with said curing agent forming a resiliently-deformable, waterproof, electrically non-conductive flexible material.

10. The elongate cylindrical battery container as claimed in claim 1, further having a biasing member situated at one end of said elongate hollow tube for exerting a force against said at least one battery for damping longitudinal vibrations exerted on said at least one battery when located in said battery container.

11. The elongate cylindrical battery container as claimed in claim 10, wherein said biasing member at said one end of said elongate hollow tube is a helical spring.

12. An elongate cylindrical battery container for use downhole in measurement-while-drilling operations which damps lateral vibration of at least one cylindrical battery contained therein, comprising:
(i) an elongate, substantially cylindrical, hollow tube adapted to contain therewithin at least one substantially cylindrical battery;
(ii) at least one elongate electrically-conductive member extending substantially longitudinally along a length of said elongate hollow tube, adapted at one end thereof to be in electrical communication with one electrical contact of said at least one cylindrical battery when said at least one cylindrical battery is inserted in said elongate hollow tube wherein said elongate electrically-conductive member is integrally molded within said elongate hollow tube along said length of said elongate hollow tube; and
(iii) a plurality of resiliently-deformable protruding rib members, extending substantially along a longitudinal length of said elongate hollow tube, disposed around a cylindrical periphery of said battery container and of a thickness so as to extend uniformly radially inwardly or outwardly from said cylindrical periphery of said elongate hollow tube and adapted to be resiliently deformable in a downhole environment within a drill string or tubing string in a wellbore being drilled; and
(iv) at least one of said plurality of resiliently-deformable protruding rib members situated on said interior or exterior cylindrical periphery of said elongate hollow tube at a location thereon proximate to or directly overlying said elongate electrically-conductive member molded therein, and extending along substantially a length thereof.

13. The elongate cylindrical battery container as claimed in claim 12,
wherein said plurality of resiliently-deformable rib members extend substantially a length of said elongate hollow tube and are each in mutual parallel arrangement with each other and uniformly and circumferentially spaced about said cylindrical periphery of said elongate hollow tube.

14. A cylindrical battery pack containing therewithin a plurality of elongate cylindrical batteries in end-to-end juxtaposed position for use downhole in measurement-while-drilling operations, which battery pack provides vibration reduction to said plurality of cylindrical batteries contained therein, comprising:
(i) an elongate, substantially cylindrical hollow tube, containing therewithin said plurality of elongate substantially cylindrical batteries arranged end-to-end;
(ii) a flat, elongate, electrically conductive ribbon member integrally formed within said hollow tube, and extending substantially the length of said hollow tube and in electrical communication with at least one of said plurality of cylindrical batteries when said plurality of cylindrical batteries are inserted in said hollow tube; and
(iii) a plurality of elongate, resiliently-deformable longitudinally-extending rib members extending substantially along a longitudinal length of an interior or exterior cylindrical periphery of said elongate hollow tube , protruding radially inwardly or outwardly respectively from said cylindrical periphery of said elongate hollow tube, and circumferentially spaced about said interior or exterior cylindrical periphery of said elongate hollow tube; and
iv) at least one of said plurality of resiliently-deformable protruding rib members situated on said interior or exterior cylindrical periphery at a location thereon proximate or directly overlying said elongated electrically-conductive member molded therein, along substantially a length thereof.

15. The battery pack as claimed in claim 14, wherein said plurality of elongate, resiliently-deformable longitudinally-extending rib members extend substantially linearly along said exterior cylindrical periphery of said elongate hollow tube.

16. The battery pack as claimed in claim 14, wherein said plurality of elongate, resiliently-deformable longitudinally-extending rib members extend substantially linearly along a longitudinal length of said inner cylindrical periphery of said elongate hollow tube.

17. The battery pack as claimed in claim 14, wherein said plurality of elongate, resiliently-deformable longitudinally-extending rib members extend substantially linearly along a longitudinal length of both said outer and inner cylindrical periphery of said elongate hollow tube.

18. The battery pack as claimed in any one of claims 14-17, further having an additional plurality of elongate, resiliently-deformable longitudinally-extending rib members extending substantially along a longitudinal length of each of said plurality of cylindrical batteries thereof.

19. The battery pack for use downhole in measurement-while-drilling operations as claimed in claim 14, further comprising:
a thin hollow sleeve forming an encapsulating tube surrounding at least one battery ; and
a further plurality of elongate, resiliently-deformable, longitudinally-extending rib members extending substantially along a longitudinal length of an outer or inner cylindrical periphery of said thin hollow sleeve and circumferentially spaced apart from each other and extend radially outwardly from said outer or inner cylindrical periphery thereof.

20. The battery pack for use downhole in measurement-while-drilling operations as claimed in claim 19, wherein said thin hollow sleeve is also resiliently deformable and wherein when said battery pack is inserted in measurement-while-drilling equipment and then inserted downhole, said resiliently-deformable rib members and said thin sleeve in a region of said further plurality of resiliently-deformable rib members thereon together both absorb and damp lateral vibratory forces exerted on said battery.

21. An elongate cylindrical battery container for use in downhole in measurement-while-drilling operations which provides electrical power to a mud pulser and which battery container damps lateral vibration of at least one substantially cylindrical battery contained therein, comprising:
   (i) an elongate, substantially cylindrical hollow tube adapted to contain therewithin said at least one cylindrical battery;
   (ii) at least one elongate electrically-conductive member extending longitudinally along a length of said elongate hollow tube, adapted at one end thereof to be in electrical communication with one electrical contact of said at least one cylindrical battery when said at least one cylindrical battery is inserted in said elongate hollow tube wherein said elongate electrically-conductive member is integrally molded within said elongate hollow tube along said length of said elongate hollow tube; and
   (iii) a plurality of resiliently-deformable protruding rib members uniformly disposed about or positioned along a cylindrical periphery of said elongate hollow tube and each extending substantially along a longitudinal length of said elongate hollow tube, each of said rib members of a thickness so as to extend uniformly radially inwardly or outwardly from said cylindrical periphery of said elongate substantially cylindrical hollow tube and spaced about or along said cylindrical periphery of said elongate substantially cylindrical hollow tube, adapted to be resiliently deformable in a downhole environment within a drill string or tubing string in a wellbore being drilled when subject to lateral applied forces;
   iv) at least one of said plurality of resiliently-deformable protruding rib members situated on said interior or exterior cylindrical periphery of said elongate, substantially cylindrical hollow tube at a location thereon proximate to or directly overlying said elongated electrically-conductive member molded therein, along substantially a length thereof.

22. The elongate cylindrical battery container as claimed in claim 21, wherein:
   each of said at least one cylindrical batteries are circumferentially surrounded about said cylindrical periphery thereof by a thin resiliently-deformable tubular sleeve; and
   a second plurality of resiliently-deformable rib members are integrally formed within said thin resiliently-deformable sleeve and disposed about or along an outer or inner cylindrical periphery of said thin resiliently-deformable sleeve.

23. The elongate cylindrical battery container as claimed in claim 21, further having a biasing member situated at one end of said elongate tube for exerting a force against said at least one battery for damping longitudinal vibrations exerted on said at least one battery when located in said battery container.

\* \* \* \* \*